US00RE36545E

United States Patent [19]

Steiner

[11] E Patent Number: Re. 36,545

[45] Reissued Date of Patent: Feb. 1, 2000

[54] TWIN BOBBIN FOUR POLE MOTORS AND METHODS FOR MAKING SAME

[76] Inventor: Robert E. Steiner, 1760 Horeshoe Ridge, Chesterfield, Mo. 63005

[21] Appl. No.: 09/073,533

[22] Filed: May 6, 1998

Related U.S. Patent Documents

Reissue of:

[64] Patent No.: 5,627,424
Issued: May 6, 1997
Appl. No.: 08/381,188
Filed: Jan. 31, 1995

U.S. Applications:

[63] Continuation-in-part of application No. 08/129,336, Sep. 30, 1993, abandoned, application No. 08/199,600, Feb. 22, 1994, abandoned, application No. 08/381,187, Jan. 31, 1995, Pat. No. 5,619,086, and application No. 08/372,035, Jan. 12, 1995, Pat. No. 5,640,752.

[51] Int. Cl.[7] ..... H02K 1/12

[52] U.S. Cl. ..... 310/258; 310/172; 310/179

[58] Field of Search ..... 310/171, 180, 310/184, 187, 159, 193, 216, 218, 194, 172, 258

[56] References Cited

U.S. PATENT DOCUMENTS

| | | | |
|---|---|---|---|
| 335,325 | 2/1886 | Voelker | 310/40 R |
| 335,326 | 2/1886 | Voelker | 310/40 R |
| 392,660 | 2/1888 | Bidwell | 310/194 |
| 1,569,218 | 1/1926 | Dake | 310/250 |
| 3,502,922 | 3/1970 | Welker | 310/172 |
| 3,983,621 | 10/1976 | Donahoo | 29/596 |
| 3,986,062 | 10/1976 | Morrill | 310/172 |
| 4,017,776 | 4/1977 | Fiegel | 318/208 |
| 4,554,471 | 11/1985 | Bertram et al. | 310/49 R |
| 4,786,834 | 11/1988 | Grant et al. | 310/194 |
| 4,801,775 | 1/1989 | Cornell | 219/10.55 |
| 4,801,776 | 1/1989 | Cornell | 219/10.55 |
| 4,827,237 | 5/1989 | Blackburn | 336/212 |
| 4,883,997 | 11/1989 | De Cesare | 310/179 |
| 4,942,323 | 7/1990 | De Cesare | 310/208 |

*Primary Examiner*—Clayton LaBalle
*Attorney, Agent, or Firm*—Polster, Lieder Woodruff & Lucchesi, LC

[57] ABSTRACT

A double twin bobbin four pole motor is disclosed. The motor includes a first and second stack of magnetically conductive stacked laminations. The first stack includes a four pole central portion with a rotor opening and two pairs of spaced side legs, each spaced pair of side legs extending from opposite sides of the central portion generally in mirror image relationship with one another and terminating in an outer free extremity. Each of the stacked side legs of the stacked spaced pair of side legs have a combined predetermined outer cross sectional configuration. The second stack of laminations includes a pair of separate magnetically conductive stacked laminations for attachment to the outer free extremities of each pair of stacked side legs. Each of the second stack of laminations have a combined predetermined outer cross sectional configuration. At least one electrically conductive coil is positioned about the combined predetermined outer cross sectional configuration of one of each of the stacked side legs of the first stack of laminations or about each of the second stack of laminations. Each electrically conductive coil is preferably wound about an insulating bobbin which may be integrally connected to another insulating bobbin to facilitate winding of an electrically conductive wire about the insulating bobbins and subsequent mounting of the insulating bobbin over the spaced stack legs on each side of the central portion. An improved method of manufacturing the first and second stack of laminations from an elongated strip of magnetically conductive material is also disclosed.

32 Claims, 15 Drawing Sheets

TWIN BOBBIN FOUR POLE MOTORS AND METHODS FOR MAKING SAME

Matter enclosed in heavy brackets [ ] appears in the original patent but forms no part of this reissue specification; matter printed in italics indicates the additions made by reissue.

CROSS REFERENCE TO RELATED APPLICATIONS

This is a continuation-in-part of the following copending patent applications: U.S. Ser. No. 08/129,336 filed Sep. 30, 1993 entitled METHOD FOR MANUFACTURING IMPROVED ELECTRO-MAGNETIC INDUCTOR DEVICES *now abandoned*. U.S. Ser. No. 08/199,600 filed Feb. 22, 1994 entitled LOW COST C-FRAME MOTORS AND METHODS OF MANUFACTURE *now abandoned*. U.S. Ser. No. 08/381,187 filed Jan. 31, 1995 entitled TWIN BOBBIN C-FRAME MOTORS AND METHODS FOR MAKING SAME *now U.S. Pat. No. 5,619,086*; and U.S. Ser. No. 08/372,035 filed Jan. 12, 1995 entitled CONTROLLABLE ADJUSTABLE MANUFACTURING METHOD AND APPARATUS FOR VARIABLE LAMINATIONS USED IN ELECTRO-MAGNETIC INDUCTION DEVICES *U.S. Pat. No. 5,640,752*.

BACKGROUND OF THE INVENTION

The present invention relates to low cost four pole motors and their methods of manufacture, and more particularly, to a new and improved twin bobbin four pole motor as well as new and improved methods of manufacture.

Current four pole motors are typically manufactured as an aaaular or doaut shaped element with four poles equistantly spaced about the periphery of the annular or donut shaped element. In some designs, a square or rectangular shaped element is chosen in lieu of the annular or donut shaped element. An annular or other closed shape construction is chosen since it produces the shortest mnagnetic path in the most economical design that caa be adapted to a variety of different end uses. For example, the magnetic flux around an annular or donut shaped element is split at each pole in two different paths and comes off each pole in a direction generally perpendicular to the center of each pole. As will be seen in the discussion that follows, such flux path movement while useful in current designs nonetheless creates inherent limtations in improving the cost and operating efficiency of such motors.

In the new and improved twin bobbin four pole construction of the present invention spaced pairs of legs extend from opposite sides of a four pole central portion which includes a rotor opening for receiving a rotor. At the free end of each of the spaced legs, an end leg extends across to each of such spaced legs. Bobbins are mounted over each leg of the spaced pair of legs on opposite sides of the central portion or about each of the end legs, depending on the design that is chosen. In either case, substantial savings are possible as a result of the "foot print" of such designs, as well as in the amount of material required for each electrically conductive coil wound about each insulating bobbin. For example, an electrically conductive coil that is positioned over each of the spaced side legs on opposite sides of the central portion can have less than one-half the length of a single electrically conductive coil, in an equivalent magnetic inductor circuit, and the diameter of the electrically conductive wire can be reduced, as well. By positioning an electrically conductive coil on each of the spaced legs, a longer winding length with smaller mean coil winding diameter is provided, resulting in a substantially shorter length for the electrically conductive wire that forms each electrically conductive coil. Additionally, there is a reduction in the diameter of the electrically conductive wire in each such electrically conductive coil. The shorter wire length of each electrically conductive coil is due to the greater surface area of the electrically conductive coils and the proximate location of the spaced electrically conductive coils on the spaced pairs of side legs on each side of the central portion relative to the poles and aligned rotor opening and rotor.

In addition, where insulating bobbins with wound electrically conductive coils are mounted over each pair of stacked legs on opposite sides of the central portion, it may also be possible to provide improved operating performance and efficiency over current four pole motors. In part, this may be due to the greater cross sectional area of the new and improved construction even though the total lamination material used is less.

It certain motor constructions of the present invention, the combined predetetmined outer cross sectional configuration of the spaced side legs may have the typical four-sided (square or rectangular) confguration, however in certain designs, a higher order greater than four sides outer cross sectional shape may be employed in order to produce an even greater savings in the amount of electrically conductive wire required, as compared to typical polygonal cross sectional configurations. This can be later understood by reference to my aforementioned copending patent applications.

In the discussion that follows, the present invention discloses new and improved four pole motor constructions, as well as new and improved methods of manufacturing such motor constructions also with improved efficiency and lower material usage.

SUMMARY OF THE INVENTION

Among the several objects and advantages of the present invention include:

The provision of new and improved four pole motors;

The provision of the aforementioned four pole motors with a low cost and high efficiency;

The provision of the aforementioned four pole motor constructions which employ several different typs of twin bobbin constructions;

The provision of the aforementioned four pole motor constructions which have a substantial reduction in the amount of material required;

The provision of the aforementioned four pole motor constructions which enjoy substatial material savings in the amount of material required for electrically conductive coils and, in certain instances, also in the magnetically conductive means forming the magnetic inductor circuit;

The provision of the aforemetioned four pole motor constructions which further include additional material savings in other components used in such motors;

The provision of the aforementioned four pole motor constructions which, despite having substantial material savings in the construction of such motors, may, in certain instances, provide better efficiency and overall performance than prior art four pole motors;

The provision of the aforeemetioned four pole motor constructions which are readily adaptable to present manufacturing techniques, do not require substantial modifications or changes and provide highly efficient lower cost motors than prior art constructions;

The provision of a new and improved method of manufacturing four pole motors;

The provision of a new and improved method of forming four pole motors with new and improved method or procedural steps that provide reliable, continuous operation without substantial modifications or changes in known manufacturing techniques.

Briefly stated the low cost, high efficiency four pole motor of the present invention includes magnetically conductive stacked laminations providing a first stack of laminations each having a four pole central portion with a rotor opening and two pairs of side legs. Each spaced pair of side legs extend from opposite sides of the central portion generly in mirror image relationship with one another and terminate in an outer free extremity. The combined stacked laminations provide spaced pairs of stacked side legs on opposite sides of stacked central portions having aligned rotor openings for receiving a rotor. Each of the stacked side legs of the stacked spaced pairs of side legs having a combined predetermined outer cross sectional configuration. Separate magnetically conductive stacked laminations forming two stacks each provide a second stack of laminations for attachment to the outer free extremities of one pair of stacked side legs in the first stack of laminations. Each of the second stack of laminations have a combined predetermined outer cross sectional configuration. At least one electrically conductive coil is positioned about the combined predetermined outer cross sectional configuraton of at least one of each of the stacked side legs of the fart stack of laminations or about each of the second stack of lamiations.

In one of such designs, ana electrically conductive coil is positioned about each of the stacked side legs of the first stack of laminations prior to the attachment of the second stack of laminations to the outer free extremities of each pair of stacked side legs in the first stack of laminations. In another design, an electrically conductive coil is positioned about each of the second stack, of laminations prior to attachment to the outer free extremities of each pair of stacked side legs of the first stack of laminations.

The combined predetermined outer cross sectional configuration of one of such design provides each of the stacked side legs with a four sided (square or rectangular) outer cross sectional shape with each electrically conductive coil positioned about each of the stacked side legs having a corresponding shape. In another design, the combined predetermined outer cross sectional configuration of such stacked side legs provides a higher order greater than four sides outer cross sectional shape with each associated electrically conductive coil having a corresponding shape. In still another of such designs, the combined predetermined outer cross sectional couttion of each of the second stack of laminations has a higher order greater than four sides outer cross sectional shape with each of the electrically conductive coils positioned about each of the second stack of laminations having a corresponding shape.

In those constructions where each of the electrically conductive coils are positioned about each of the stacked side legs, such coils are positioned in close proximity to the aligned rotor openings of the stacked central portions and the rotor.

An electrically conductive wire forms each electrically conductive coil and is layer wound in closely packed relationship in a plurality of juxtapose rows in its positioned relationship on each coil winding area. Preferably, in insulating bobbin with wound electrically conductive coil is positioned on each combined predetermined coil winding area in the first stack of laminations in the one motor construction and in the combined piedetermined coil winding area of the second stack of lamiaions in the other motor construction.

Where the motor design employs spaced stacked side legs on each side of the central portion with an electrically conductive coil wound about each of the stacked side legs, less than one-half the length of an electrically conductive wire is used in forming each electrically conductive coil, as compared with an electrically conductive wire forming a single electrically conductive coil in an equivalent magnetic inductor circuit. The electrically conductive wire in each such electrically conductive coil not oniy has a predetermined shorter length, but also can have a predetermined smaller diameter than a single electrically coaductive coil in an equivalent magnetic inductor circuit.

In an alternative emblodimnent U-shaped laminations each having a stacked pair of side legs for association with electrically conductive coils can be attached to opposite sides of a base lamination having a rotor opening for receiving a rotor.

In still another embodiment of the present invention, spaced pairs of insulating bobbins are positioned about the spaced and stacked side legs on each side of the central portion, each pair of insulating bobbins being integrally connected to one another while the associated wound electrically conductive coils of each such pair of insulating bobbins comprises an electrically conductive wire that is integrally and electrically connected and wound about each pair of insulating bobbins.

The present invention also discloses a new and improved method of forming four pole motors from an elongated strip of magnetically conductive material by stamping from the elongated strip a central portion with a rotor opening and two spaced pairs of side legs extending from opposite sides of the central portion in general mirror image relationship to each other. Each of the two spaced pairs of side legs are formed with a combined predetermined outer cross sectional configuration. Separate end leg laminations for attachment to the outer free extremities of the spaced pair of side legs are then formed, at least one of the separate end leg laminations being formed from the elongated strip.

Preferably, at least some of the separate end leg laminations are formed from the elongated strip between the spaced pairs of side legs. At least some of the separate end leg laminations may also be formed from outside of the confines of the elongated strip. At least some of the separate end leg laminations may also be formed from a separate elongated strip of magnetically conductive material. In certain instances, at least two separate end leg laminations may be formed from the elongated strip between the opposed and spaced legs of adjacent laminations. Complementary fastening elements may also be formed between the opposed and spaced side legs of adjacent laminations for attachment to complementary fastning elements forming separate end leg laminations.

Preferably, the method includes the forming of adjacent laminations with one pair of spaced side legs from each of said laminations being connected to one another during the mnufacturing process, but then being subsequently separated from one another. At least some of the end leg laminations are formed from the elongated strip betwen the spaced pair of side legs of adjacent laminations.

The method of the present iavention also includes the forming of a series of magnetically conductive base laminations each having a central portion with a rotor opening and opposed pairs of spaced side legs extending from opposite ends of the central portion with a predetermined configuration in each of the side legs and with each of the side legs terminating in outer fre extremity. The base laminations are then stacked in generally vertically aligned relationship in a predetermined sequence with the predetermined configuration in each of said side legs forming a combined predetermined outer cross sectional coil winding area. A series of separate magnetically conductive end leg laminations are then formed corresponding in number to the base laminations for attachment to the outer free extremities of each of the spaced pair of side legs. The separate magnetically conductive end leg laminations are then stacked in generally vertically aligned relationship in order to enable an electrically conductive coil to be positioned about the coil winding area of each of the side legs. Finally, the separate end leg laminations are attached to the outer free extremities of each pair of spaced side legs in the base laminations.

In certain instances, the side legs are formed with predetermined incrementally varying widths in each of the side legs which form a coil winding area of higher order greater than four sides outer cross sectional shape. This enables an electrically conductive coil corresponding in shape to the coil winding area to be positioned around each of the side legs.

One variation of the method includes the forming and stacking of base laminations with an aligned rotor opening and the subsequent forming and stacking of U-shaped laminations for attachment in mirror image relationship to the stacked base laminations. At least one electrically conductive coil can be positioned about at least one of stacked end legs or side legs of said U-shaped stacked laminations prior to attachment to said base laminations.

The method of the present invention further includes the forming of base and end leg laminations for a four pole motor from an elongated strip of magnetically conductive material including the forming of a rotor and at least one end leg lamination adjacent to the rotor opening and extending along the strip in a central area thereof leaving a rotor opening and at least one end leg lamination opening. Subsequently, forming predetermined incrementally varying width slot openings from one side of the strip in alignment with at least one end leg lamination opening while also enlarging one side of the end leg lamination opening in predetermined incrementally varying widths to provide one side of spaced pairs of lamination side legs extending from adjacent laminations. Next, the forming of predetermined incrementally varying width slot openings from an opposite side of the strip in alignment with at least one end leg lamination opening while also enlarging an opposite side of such end leg lamination opening in predetermined incrementally varying widths to provide an opposite side of spaced pairs of lamination side legs extending from adjacent laminations. Finally, the adjacent laminations each having a rotor opening and spaced opposed pairs of side legs are separated from each other and the strip.

These and other objects and advantages of the present invention will become apparent from the description that follows.

BRIEF DESCRIPTION OF THE DRAWINGS

In the drawings.

Corresponding reference numerals will be used throughout the various figures of the drawings.

DESCRIPTION OF THE PREFERRED EMBODIMENTS

Figure 1:
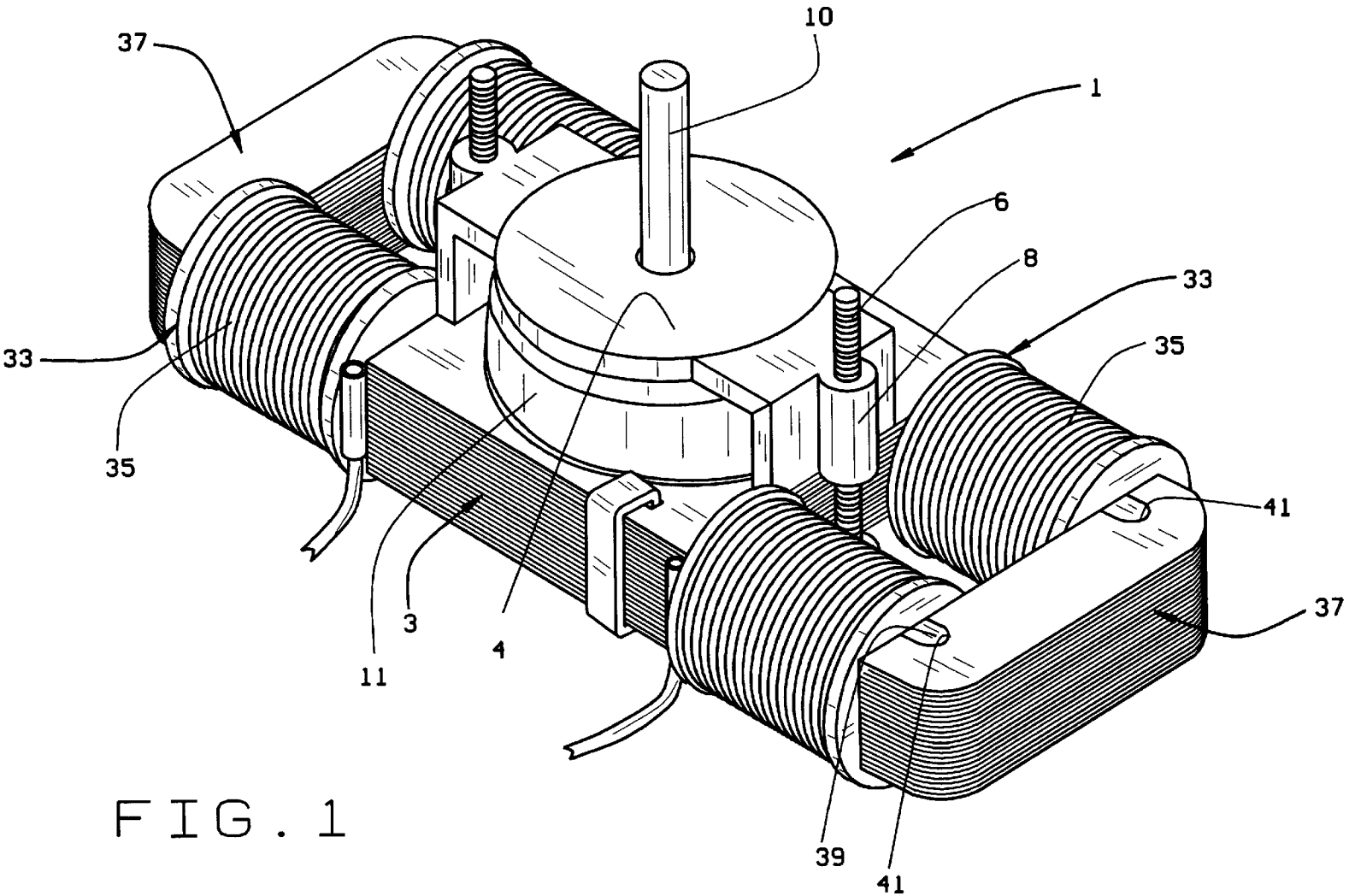
FIG. 1 is a perspective view of one form of low cost, high efficiency twin bobbin four pole motor construction of the present invention.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

As explained in my prior parent patent application U.S. Ser. No. 08/129,336 filed Sep. 30, 1993 entitled METHOD FOR MANUFACTURING IMPROVED ELECTROMAGNETIC INDUCTION DEVICES, some prior art motor constructions typically require the winding of electrically conductive wires in relatively loose fitting and random winding about coil or coil winding areas that have a square or rectangular cross sectional configuration. As will be appreciated, this requires a predetermined amount of electrically conductive wire to form electrically conductive coils that are wound about the coil core winding areas in various motor constructions. By changing the coil winding area of the poles to a higher order greater than four sides, i.e., one having a substantially circular outer cross sectional configuration at least along opposed spaced sections thereof, several important advantages are achieved. First, a substantially circular outer cross sectional shape provides a cross sectional area with a shorter circumference in the magnetic inductor circuit to wind an electrically conductive wire in order to form an electrically conductive coil. Without sacrificing motor efficiency, the size of the electrically conductive wire can also be reduced in size. Additionally, the generally circular outer cross sectional shape enables the electrically conductive wire to be layer wound in closely packed relationship in a plurality of superimposed rows. This is preferably achieved by the use of an insulating bobbin which is constructed to permit the electrically conductive wire to be layer wound in the above described manner to form the electrically conductive coil. As a result, a close fitting and efficiently wound electrically conductive coil is provided.

In my aforementioned copending patent application U.S. Ser. No. 08/199,600 filed Feb. 22, 1994 entitled LOW COST C-FRAME MOTORS AND METHODS OF MANUFACTURE, I have disclosed that by making the outer cross sectional shape of the winding area with a higher order greater than four sides outer cross sectional shape, for example, generally circular in outer cross sectional shape, as well as being always equal in area to the legs adjacent to the winding area in the C-frame motor, the motor will always have the minimum ratio of winding area perimeter to cross sectional area and therefore the minimum usage of copper. In addition, additional savings are possible in other components such as smaller end bells/frame components or frame members which employ less material with lighter weight constructions.

As further disclosed in my copending patent application Ser. No. 08/381,187 filed Jan. 31, 1995 entitled TWIN BOBBIN C-FRAME MOTORS AND METHODS FOR MAKING SAME, I have disclosed that both of the spaced side legs of a first stack of laminations can be usefully employed for coil winding purposes, whether made in the typical four-sided (square or rectangular) shape or in a higher order greater than four sides outer cross sectional shape. In either case, if the coil winding areas of the spaced side legs are positioned in proximity to aligned rotor openings of the first stack of laminations which receive a rotor, several important advantages are achieved. The mounting of the electrically conductive coils over the spaced side legs provides a greater and/or more efficient flow of magnetic flux in the magnetic inductor circuit. The electrically conductive wire forming each electrically conductive coil that is positioned over each of the side legs can not only have less than one-half the length of a single electrically conductive coil in a convention or magnetic inductor circuit, but the diameter of the electrically conductive wire can be reduced, as well. This diameter reduction is believed due to the shorter wire length of less than one-half length of a single electrically conductive coil, the greater winding surface area of the electrically conductive coils and the proximate location of the spaced electrically conductive coils on the spaced side legs relative to the aligned rotor openings and rotor.

As will be seen in the discussion that follows, some of the principles disclosed in my aforementioned copending patent applications have been incorporated into the present invention, along with further novel and unique features that are directed to twin bobbin four pole motor constructions, now to be discussed in detail.

Figure 12:
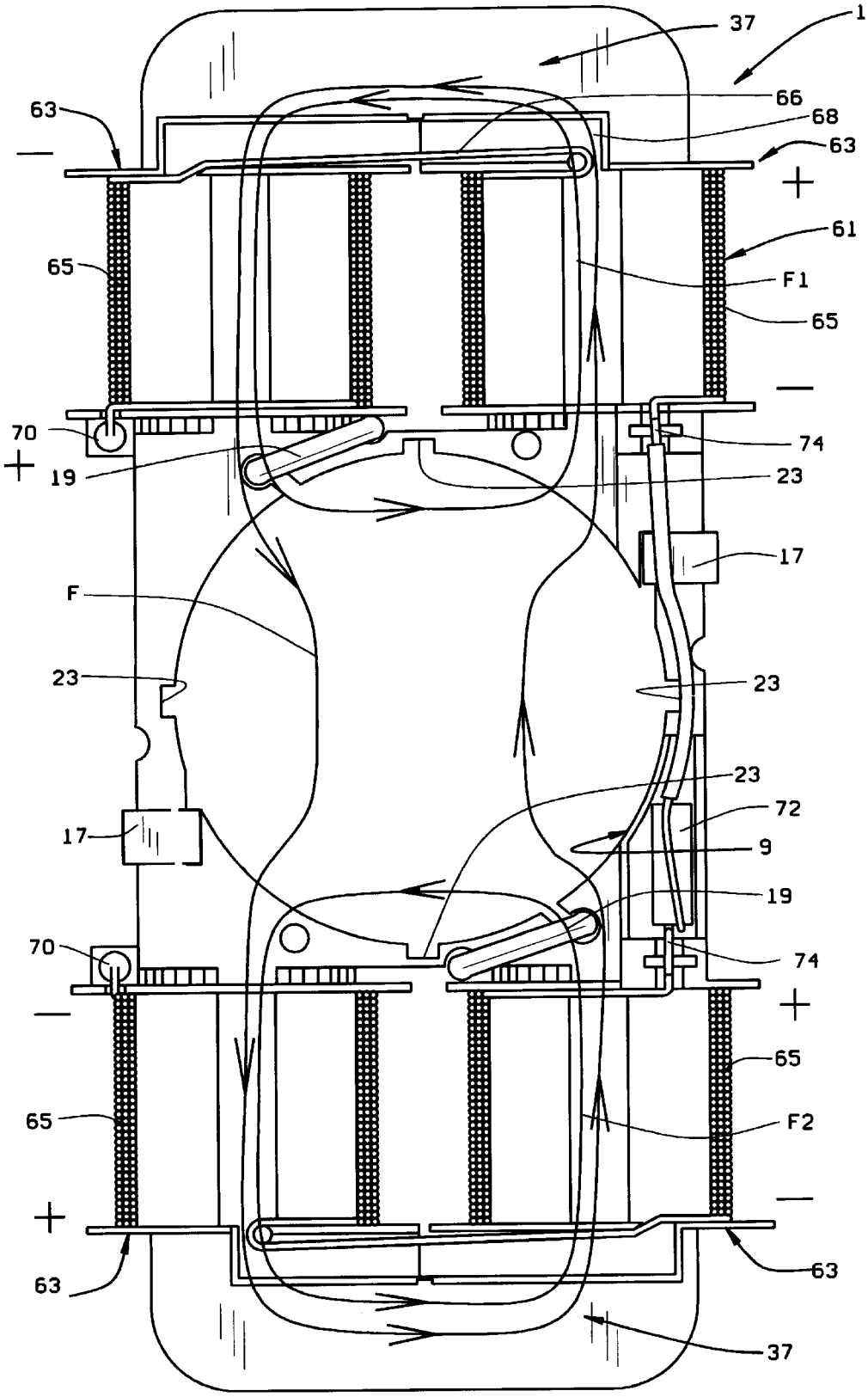
FIG. 12 is an enlarged side elevational view of the twin bobbin four pole motor shown in FIGS. 1–2 with a modified form of insulating bobbin assembly illustrated in FIGS. 13–14 of the drawings.
Figure 13:
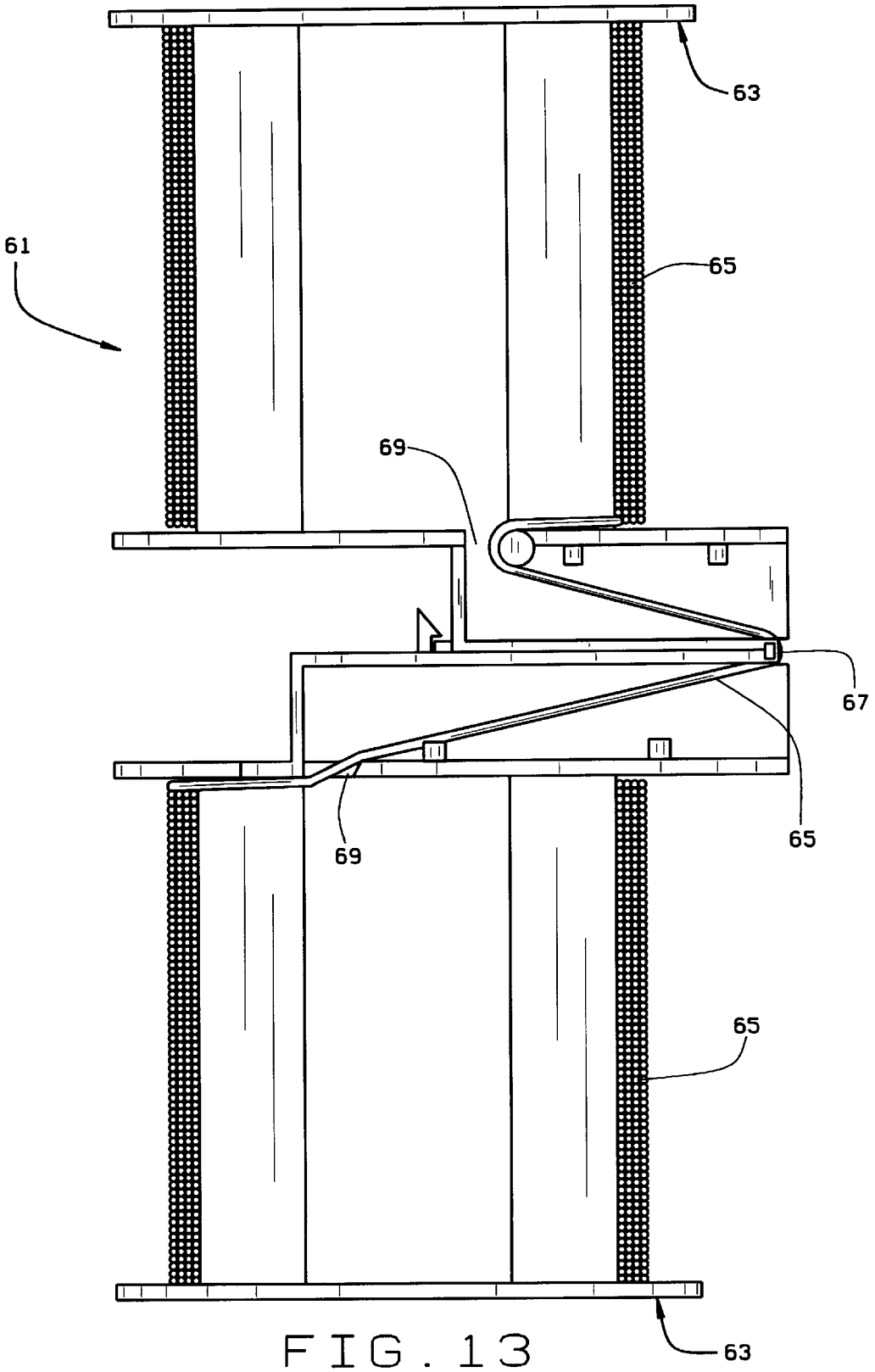
FIG. 13 is an enlarged side elevational view illustrating the manner in which the insulating bobbin assembly is used in winding electrically conductive wire about the spaced insulating bobbins to form separate electrically conductive coils from a single electrically conductive wire.
Figure 14:
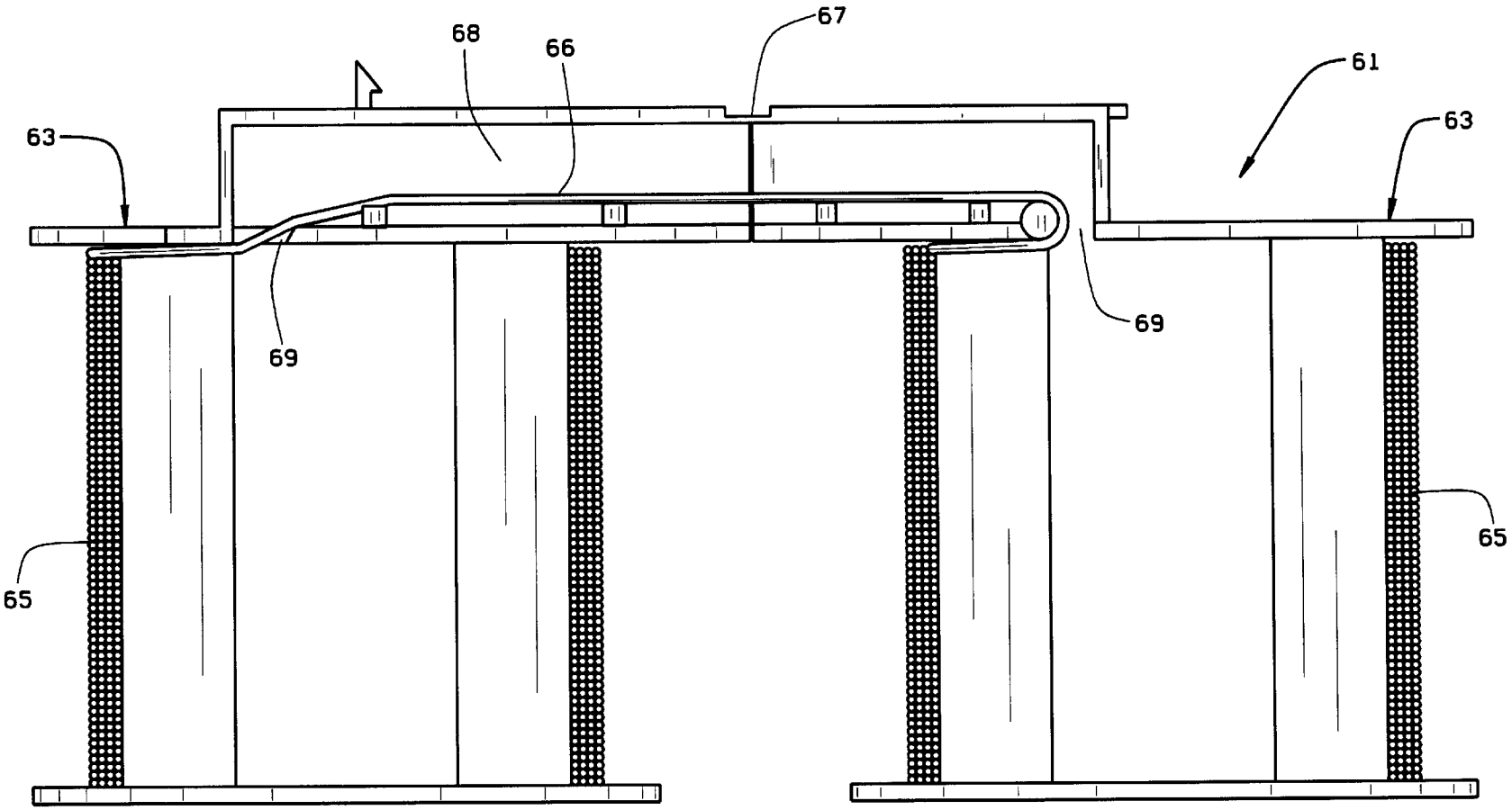
FIG. 14 is an enlarged side elevational view illustrating the manner in which the insulating bobbin assembly is folded, after winding, for assembly relative to the spaced legs of the base or first stack of laminations in the twin bobbin four pole motor illustrated in FIG. 12.
Figure 15:
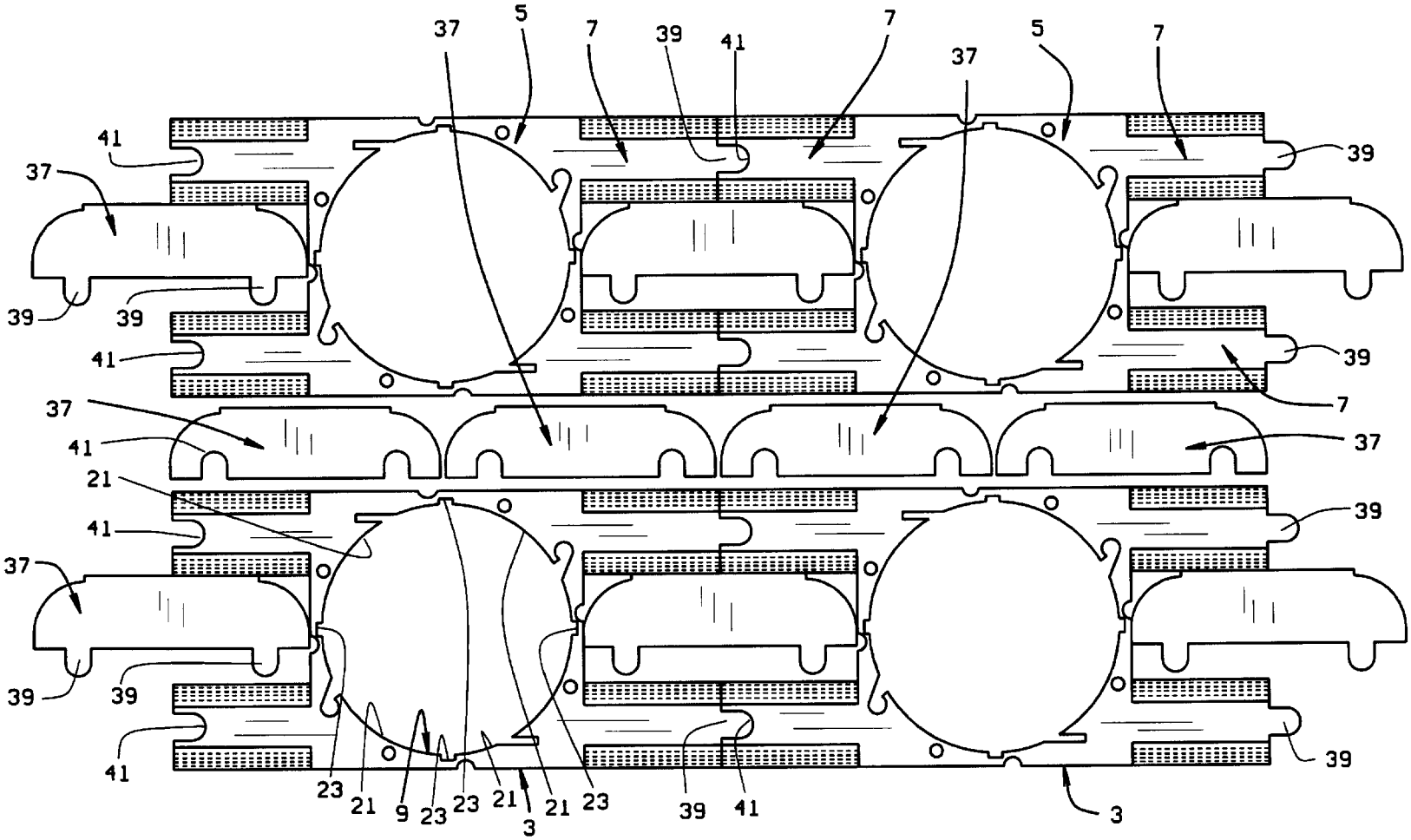
FIG. 15 is a top plan view illustrating the die layout used in the method of manufacturing base and end laminations used in the FIGS. 1–7 embodiment.
Figure 16:
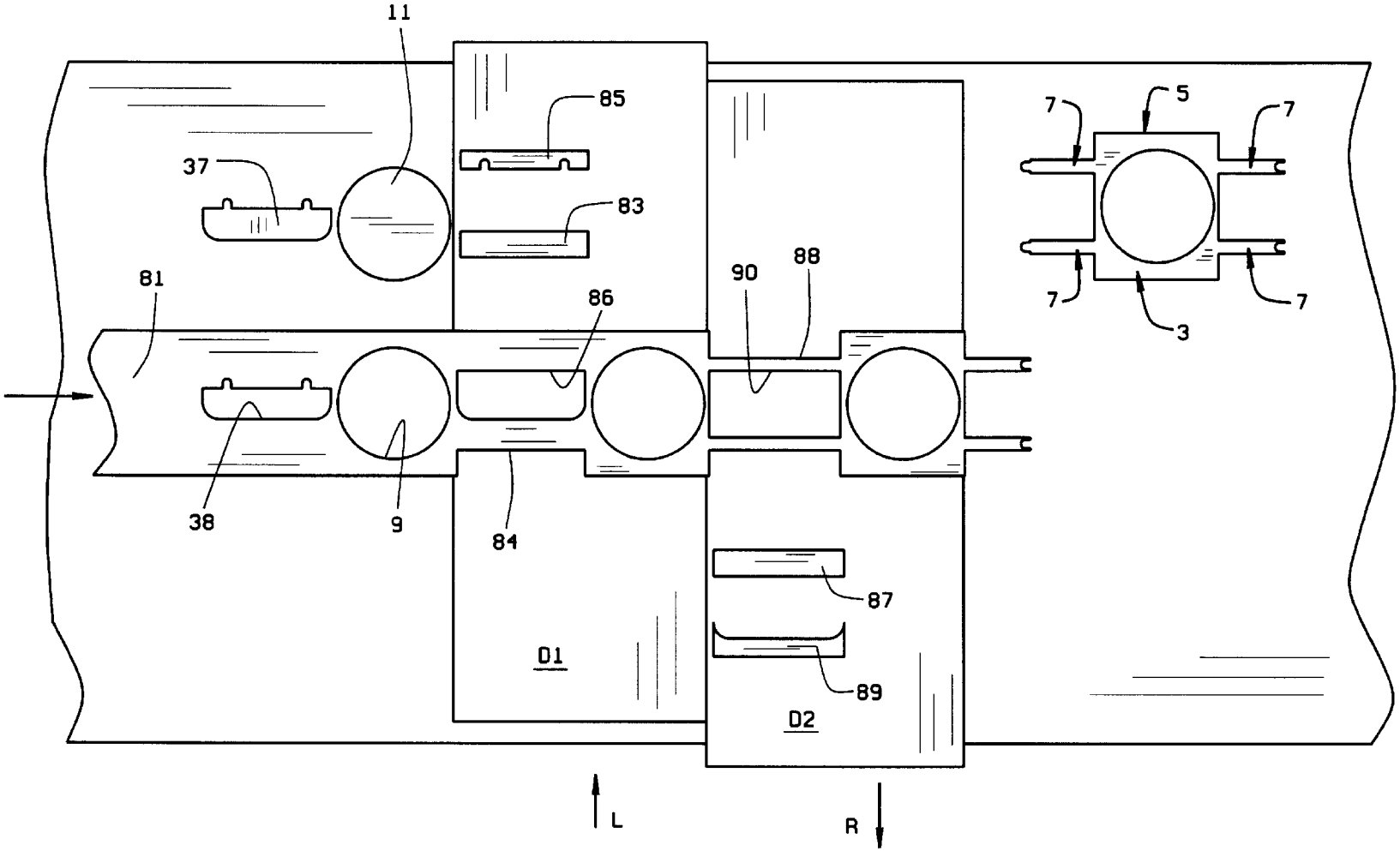
FIG. 16 is a top plan schematic view depicting the various steps in one manufacturing process or method of the present invention for manufacturing the base and end laminations shown in FIG. 15.
Figure 17:
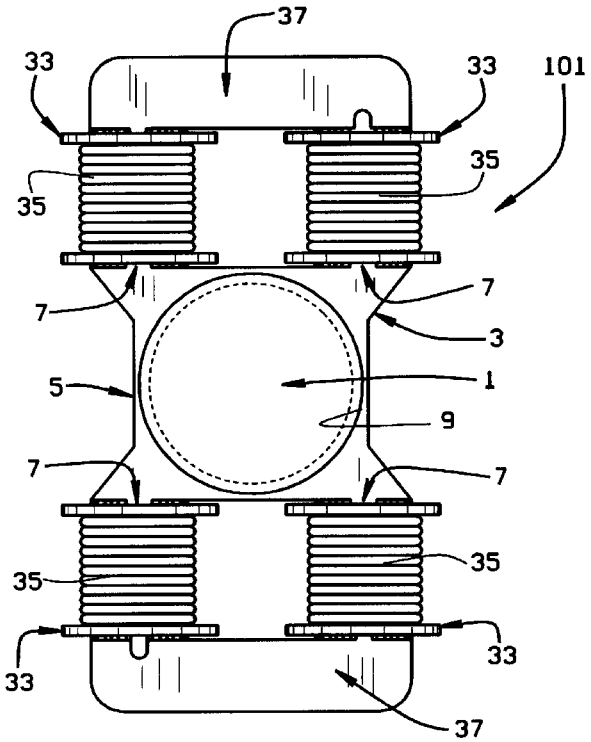
FIG. 17 is a side elevational view of a modified form of twin bobbin four pole motor according to the present invention.
Figure 18:
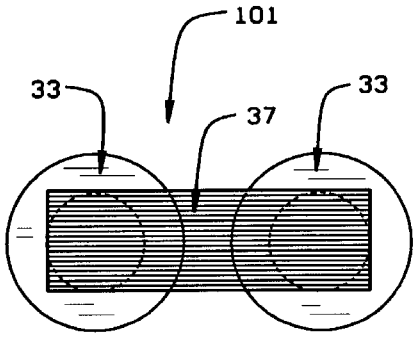
FIG. 18 is a top plan view of the modified form of twin bobbin four pole motor shown in FIG. 17.
Figure 19:
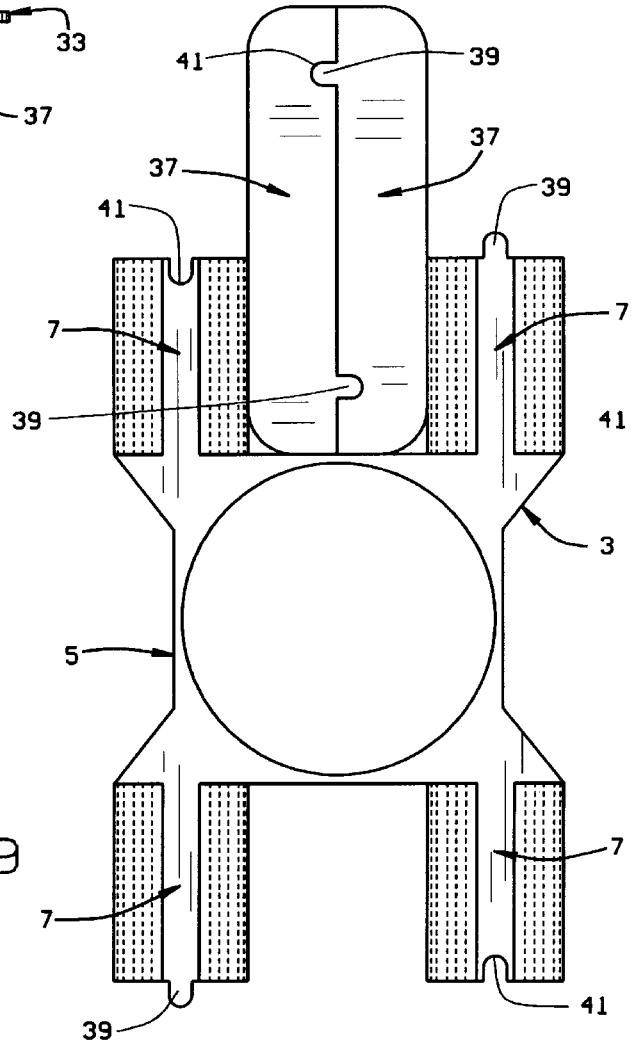
FIG. 19 is a top plan view of a die layout used in the modified form of twin bobbin four pole motor shown in FIGS. 17–18.
Figure 20:
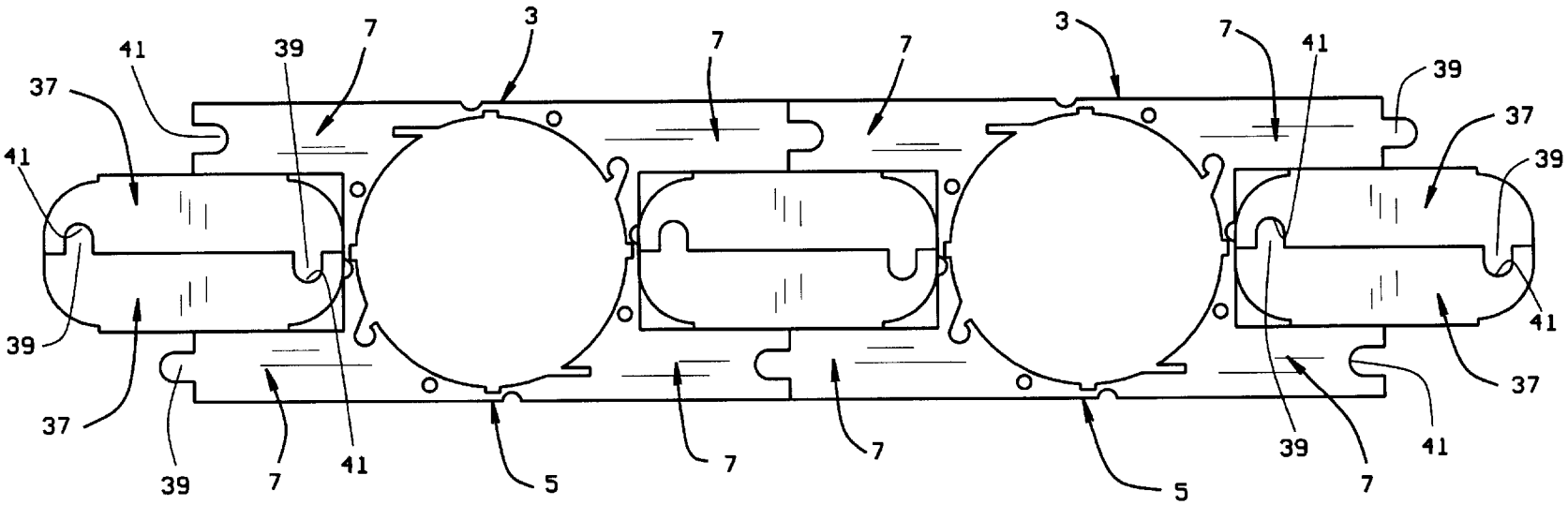
FIG. 20 is a top plan view illustrating the die layout used in the manufacture of the base and end laminations illustrated in the FIGS. 8–11 embodiment.
Figure 21:
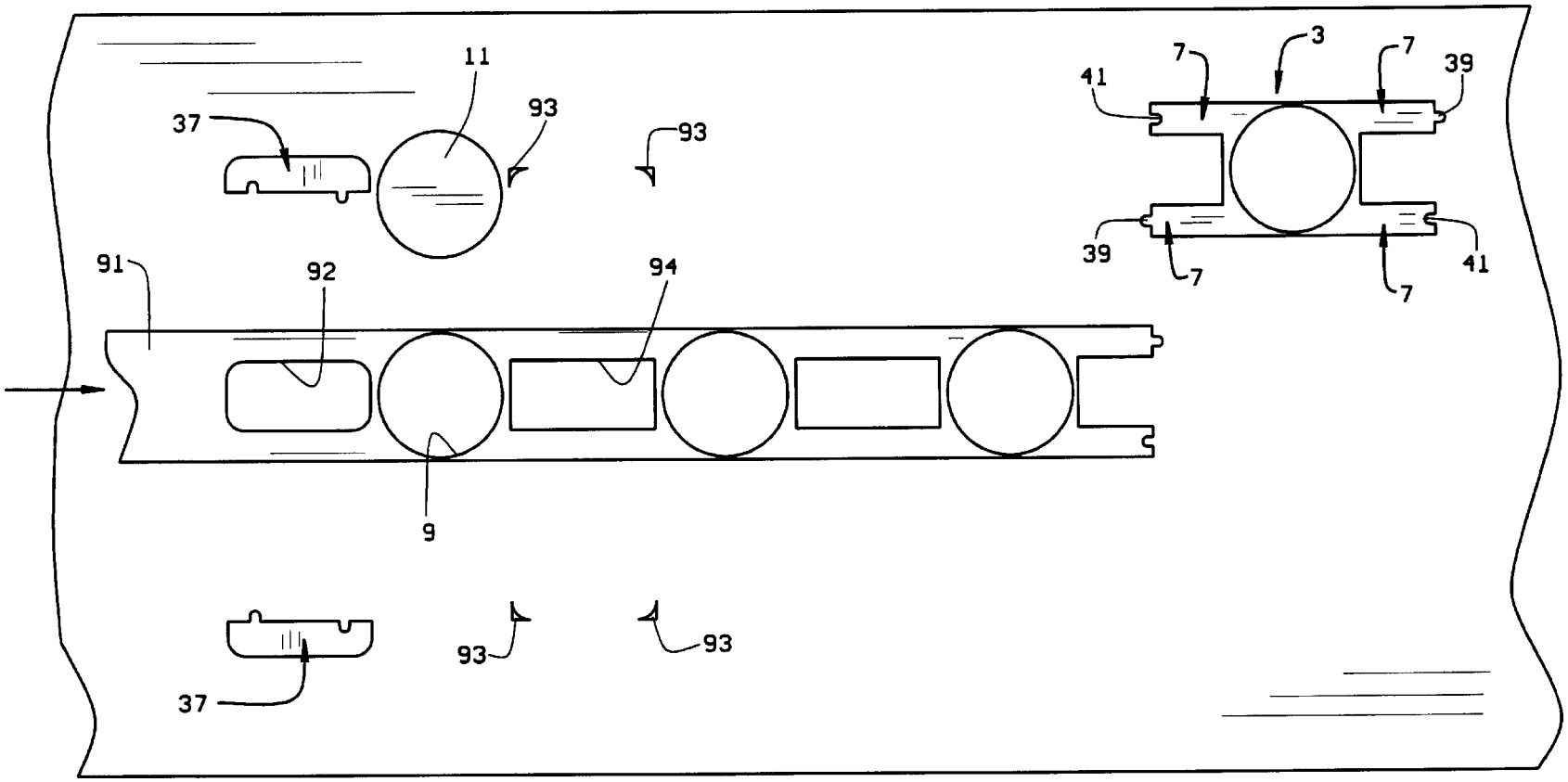
FIG. 21 is a top plan schematic depicting the method of manufacturing the modified form of twin bobbin four pole motor shown in FIGS. 8–11 of the drawings according to the die layout of FIG. 20.
Figure 22:
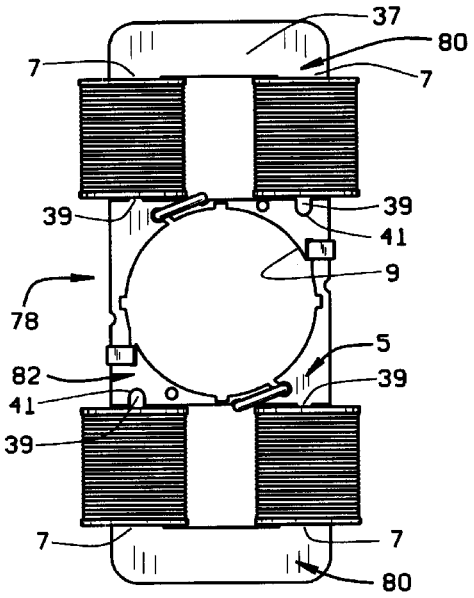
FIG. 22 shows a modified form of four pole motor within the present invention.
Figure 24:
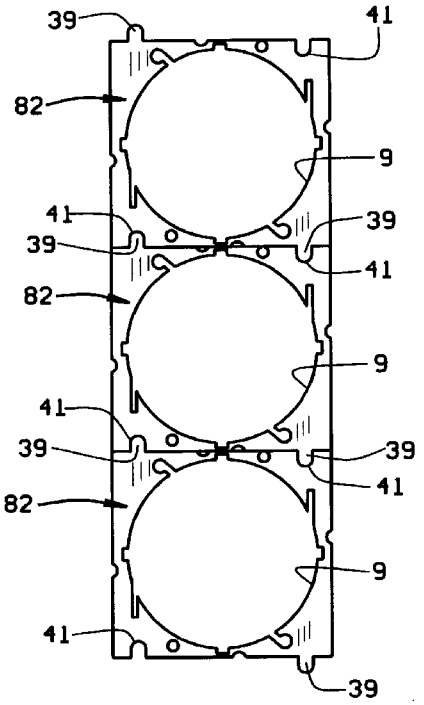
FIG. 24 is a top plan view illustrating the die layout for forming the base lamination used in the motor illustrated in FIG. 22.
Figure 23:
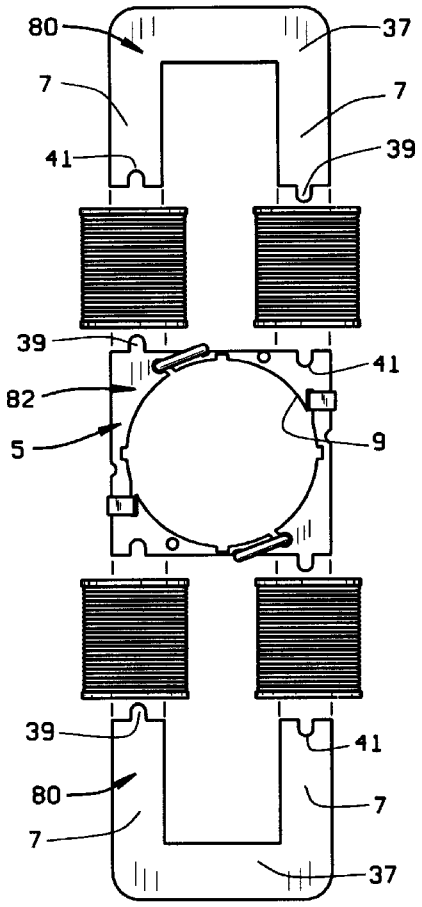
FIG. 23 is an exploded side elevational view of the components used in the FIG. 25 motor.

The twin bobbin four pole motor constructions of the present invention include several different embodiments as illustrated in FIGS. 1–7 of the drawings; FIGS. 8–11 of the drawings; FIGS. 12–14 of the drawings, FIGS. 17–18 of the drawings, FIG. 25 of the drawings and FIGS. 26–27 of the drawings. In addition, several methods of manufacturing such four pole motors are illustrated in FIGS. 15–16; FIG. 19; FIGS. 20–21; FIGS. 22–24; and FIG. 28 of the drawings.

Although there are common features used in the various four pole motor constructions of FIGS. 1–7; 8–11; 12–14; 17–18; and 25–27 of the drawings, it will also be appreciated that each of the aforementioned four pole motor constructions have unique and specific features that differ from each other, as will be explained in further detail below.

Figure 2:
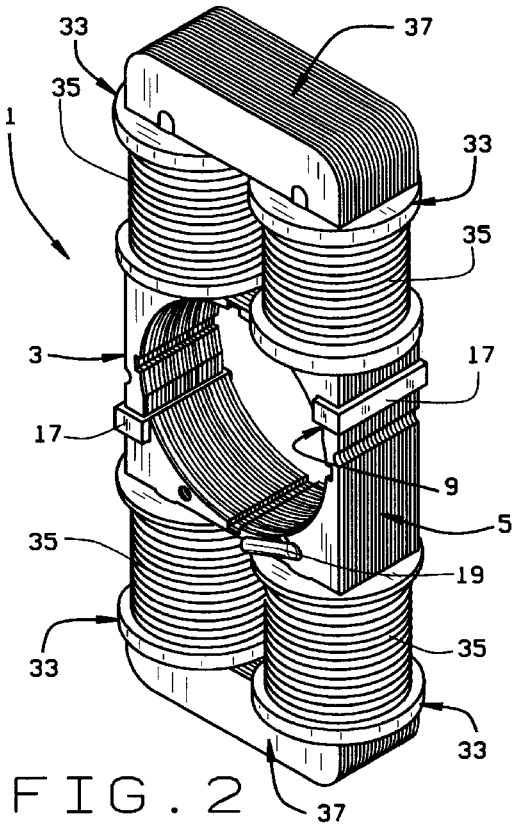
FIG. 2 is a perspective view of the twin bobbin four pole motor with the rotor bracket and rotor removed.
Figure 3:
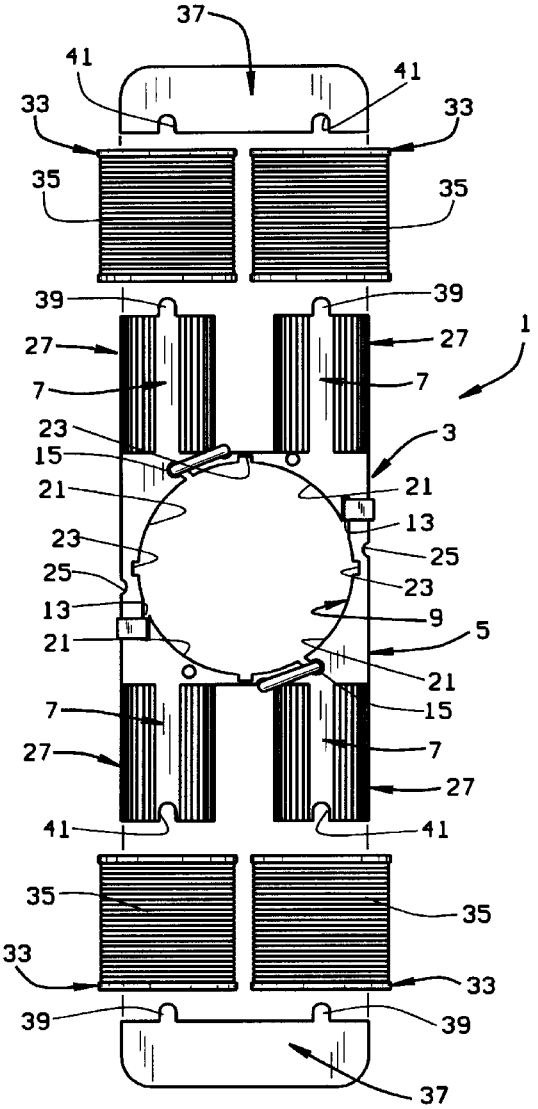
FIG. 3 is an exploded side elevational view of the twin bobbin four pole motor shown in FIG. 2.
Figure 4:
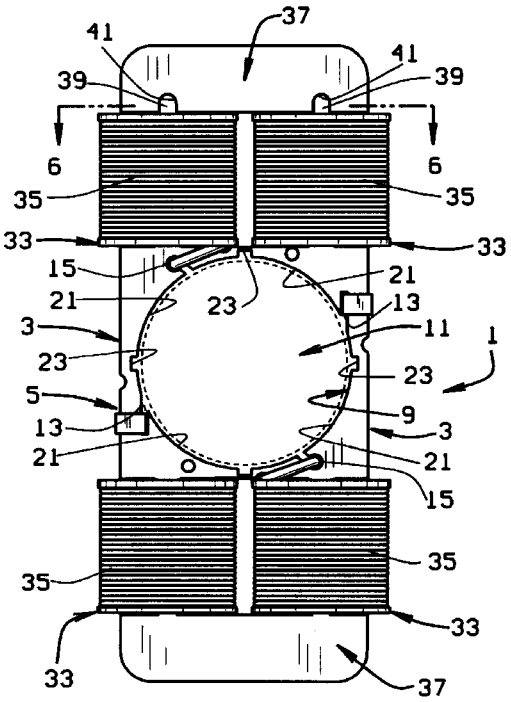
FIG. 4 is a side elevational view of the twin bobbin four pole motor illustrated in FIG. 2.
Figure 5:
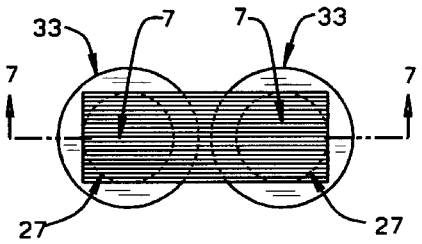
FIG. 5 is a top plan view of the twin bobbin four pole motor illustrated in FIG. 2.

As illustrated in the FIGS. 1–7 embodiment, the twin bobbin four pole motor 1 includes a first stack of laminations 3 formed from a series of magnetically conductive stacked laminations each having a four pole central portion 5 with two spaced pairs of side legs 7, 7 and 7, 7 extending from opposite sides of the central portion 5 generally in mirror image relationship with one another. In the FIGS. 1–7 embodiment, each of the spaced pair of side legs 7, 7 on each side of the central portion 5 are attached at one end to the central portion 5 and terminate at an opposite end in an outer free extremity. A combined stack of laminations 3 provides spaced pairs of stacked side legs 7, 7 on opposite sides of stacked central portions 5 providing a first stack of laminations 3. Each side leg is thus attached at one end to a circumferentially spaced area of the one-piece central portion 5 that surrounds the rotor opening 9. A rotor opening 9 is provided in the central portion 5 of each lamination that is aligned with the rotor openings 9 of adjacent central portions 5 in order to provide an aligned rotor opening 9 in the stacked central portions 5 for receiving a rotor 11, as illustrated in FIG. 4 of the drawings. The rotor 11 is made up of a series of stacked laminations having aluminum die cast bars and end rings.

As illustrated in FIG. 1 of the drawings, spaced frame or end bell elements 4, 4 extend on opposite sides of the first stack of laminations 3 and are threadably connected to one another through opposed threaded elements 6, 6, each of which are threadably associated with spaced ear elements 8, 8 that extend from each of the end bells or frames 4, 4. A rotor shaft 10, connected to the rotor 11, extends through the upper frame element 4 for connection to an element to be driven. Each of the end bells or frame elements 4, 4 have beating supports (not shown) on an inside face thereof for rotatably supporting rotor 11 and rotor shaft 10 in desired rotatably mounted relationship.

The four pole motor 1 is of the shaded pole motor type which includes shading coils to produce starting torque and rotation of the rotor 11. For this purpose, each of the laminations are provided with generally diametrically opposed openings 13, 13 and 15, 15. Each of the openings openings 13 and 15 receive a rectangular or round shading coil 17, 19, respectively, as illustrated in FIGS. 2–4 of the drawings. The shading coils 17, 19 are formed by a loop of copper or other electrical conductor which is arranged to encircle the poles 21, 21, 21, 21 of the four pole motor 1. Each of the four poles 21, 21, 21, 21 of the four pole motor are offset by reluctance gaps 23, 23, 23, 23 positioned at approximately 0°, 90°, 180°, and 270° around the opening 9. It will be noted that the rectangular shading coils 17 are received in the relatively deep opening or notch 13 in one of the thickest parts of the central portion 5 while the rounded opening 15 is angularly offset to avoid a deep opening or notch in the central portion 5 which would interfere with the flux path while, at the same time, receiving rounded shading coil 19.

Figure 6:
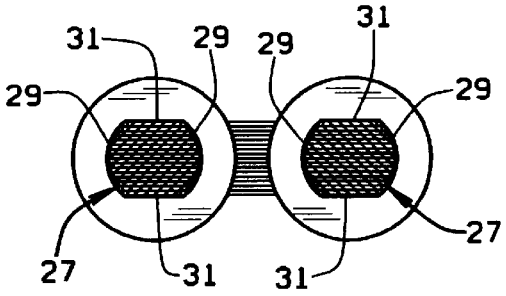
FIG. 6 is a sectional view of the twin bobbin four pole motor shown in FIG. 4, as viewed along lines 6—6 of FIG. 4.
Figure 7:
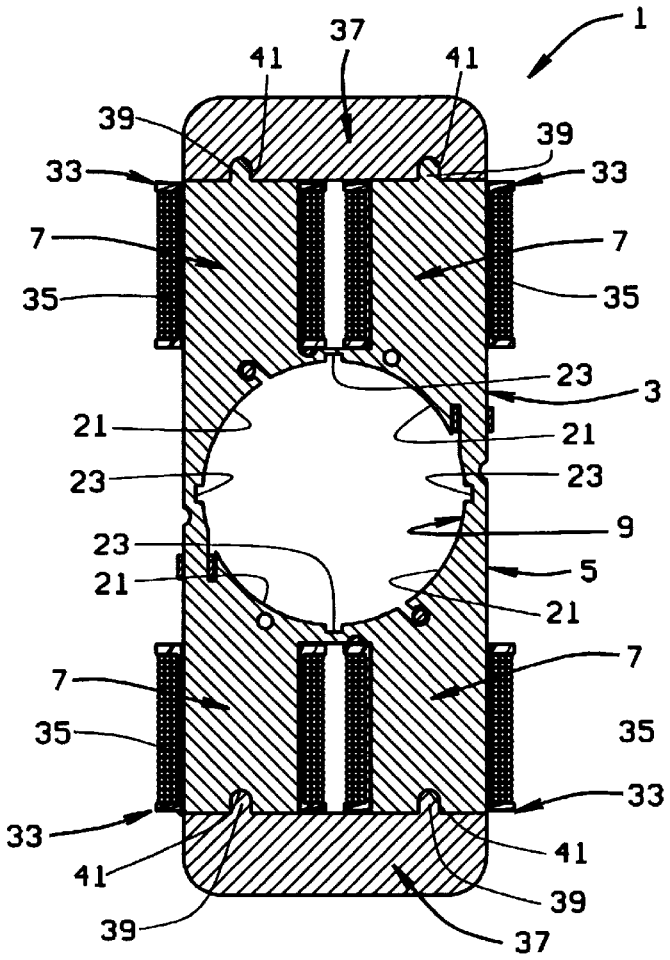
FIG. 7 is a sectional view of the twin bobbin four pole motor illustrated in FIG. 1 as viewed along lines 7—7 of FIG. 5.
Figure 8:
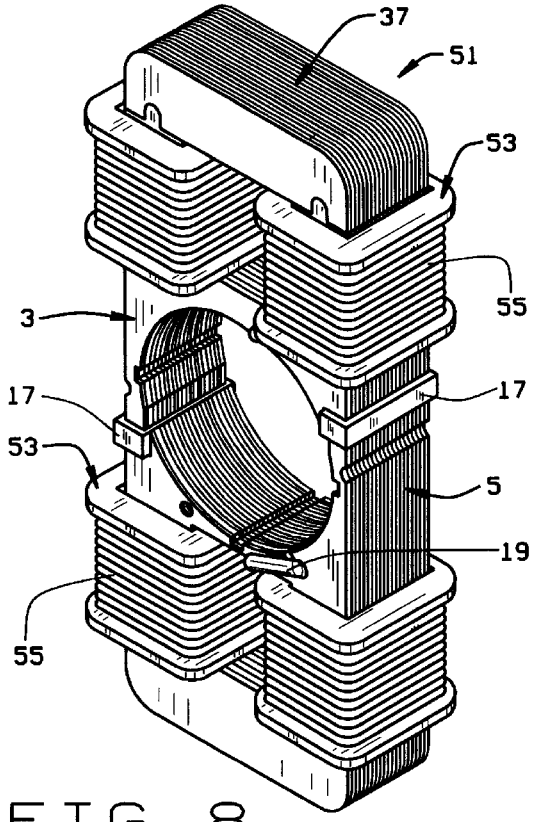
FIG. 8 is a perspective view of a modified form of twin bobbin four pole motor utilizing a typical four-sided (square or rectangular) coil winding area for each of the stacked side legs of a base or first stack of laminations with correspondingly shaped electrically conductive coils.
Figure 9:
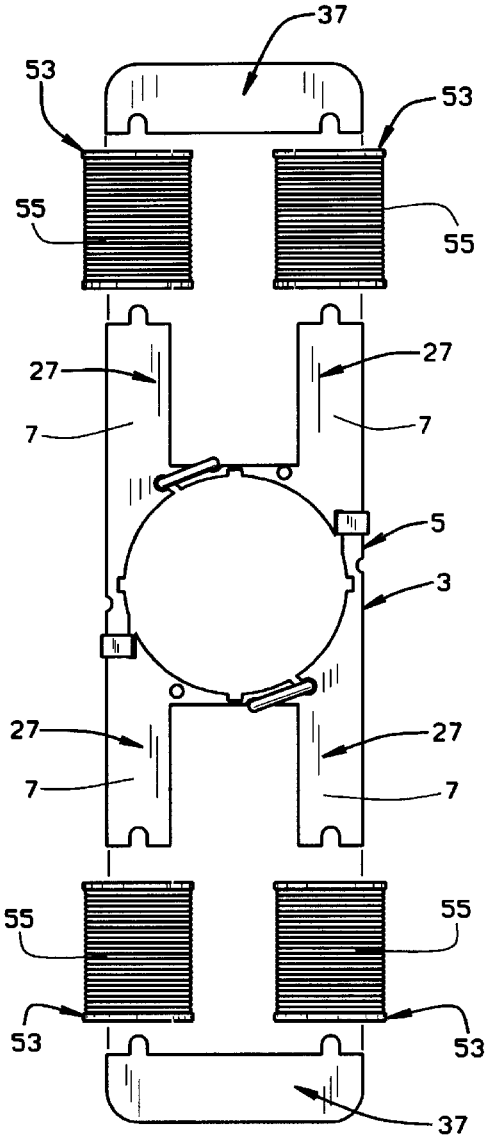
FIG. 9 is an exploded perspective view of a modified form of twin bobbin four pole motors shown in FIG. 8.
Figure 10:
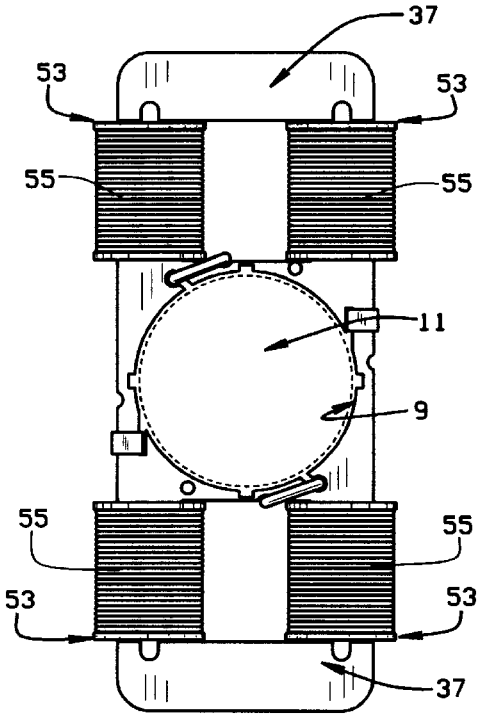
FIG. 10 is a side elevational view of the modified form of twin bobbin four pole motor shown in FIG. 8.
Figure 11:
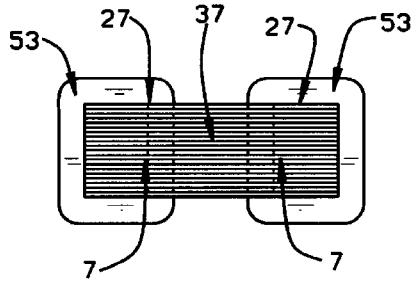
FIG. 11 is a top plan view of the modified twin bobbin four pole motor shown in FIG. 8.

Each of the stacked side legs 7, 7 on each side of the four pole central portion 5 have a combined predetermined outer cross sectional configuration coil winding area 27. In the FIGS. 1–7 embodiment, the combined predetermined outer cross sectional coil winding area is a higher order greater than four sides outer cross sectional shape, generally circular in shape, as best illustrated in FIGS. 3–6 of the drawings. Specifically, each of the stacked side legs 7, 7 on each side of the four pole central portion 5 have a substantially circular shape at least along opposed spaced sections 29, 29 thereof with opposed spaced flat areas 31, 31 along other opposite spaced sections thereof, as best illustrated in FIG. 6 of the drawings.

For purposes of the present invention, the term "higher order greater than four sides" includes a generally circular outer cross sectional shape including a full circular shape, a partially circular shape, a substantially circular shape at least along opposed spaced sections thereof or other modified shapes having a smaller outer peripheral shape other than a square or rectangular shape. Thus, a hexagonal or other greater polygonal sided shape may also be included. A square or rectangular shape, on the other hand, is considered to have a "four-sided" shape.

As disclosed in my aforementioned copending patent applications, each of the generally circular outer cross sectional shapes 27 formed in each of the spaced side legs 7, 7 on opposite sides of the four pole central portion 5 are constructed with a different progressive width, as illustrated in FIGS. 3–6 of the drawings, in order to provide an incrementally stair-stepped winding area on opposite sides of the center line that produces the generally opposed spaced circular sections 29, 29 in the FIGS. 1–7 illustrated embodiment. The manner in which the different progressive widths are formed in adjacent laminations, in order to produce generally circular outer cross sectional shape 27 for the coil winding area of each of the stacked side legs 7, 7 on opposite sides of the stacked four pole central portions 5, will be further understood in reference to the discussion below that describes the preferred method of producing such a construction.

A pair of insulating bobbins 33, 33 with previously wound electrically conductive coil or wire 35 are capable of being mounted on the spaced stack legs 7, 7 on each side of the four pole central portion 5. Thus, the embodiment illustrated in FIGS. 1–7 of the drawings has a double twin bobbin construction in that the spaced pair of insulating bobbins 33, 33 are mounted on the spaced stack legs 7, 7 on each side of the four pole central portion 5. The distance between the spaced stacked legs 7, 7 on each side of the central portion 5 provides an unimpeded joint winding window to accommodate insulating bobbins 33 with electrically conductive coils 35 on each coil winding area 27 of predetermined length and winding diameter in an overall compact motor construction. Each of the insulating bobbins 33 are generally circular in shape corresponding to the generally circular outer cross sectional shape 27 of each of the stacked side legs 7, 7 on opposite sides of the four pole central portion 5, thus producing a substantial reduction in the amount of material required for the electrically conductive wire or coil 35, as explained above. A substantially circular outer cross sectional shape provides a cross sectional area with a shorter circumference for winding an electrically conductive wire that forms each electrically conductive coil. Additionally, the generally circular outer cross sectional shape enables the electrically conductive wire to be layer wound in closely packed relationship in a plurality of superimposed rows. Finally, a reduction in the diametrical size of the electrically conductive wire can also be achieved without sacrificing motor efficiency. As a result, substantial cost savings in the amount of material required for the electrically conductive coil or wire 35 wound about each insulating bobbin 33 will result.

After each insulating bobbin 33 with wound electrically conductive coil or wire 35 is mounted on each of the stacked side legs 7 to produce spaced pairs of insulating bobbins 33, 33 on opposite sides of the four pole central portion 5, a second stack of laminations 37 formed by a corresponding number of separate magnetically conductive stack of laminations are attached to the first stack of laminations 3, as illustrated in FIGS. 1–4 and 7 of the drawings. Each of the second stack of laminations 37 constitute a second or a separate end leg. Thus, the first stack of laminations 3 have a four pole central portion with spaced pairs of side legs 7, 7, and 7, 7 extending from opposite sides thereof, while the separate magnetically conductive stacked laminations forming the second stack of laminations 37, 37 provide a separate end leg for attachment to the outer free extremities of each pair of stacked side legs 7, 7 on opposite sides of the four pole central portion 5. This completes a magnetic inductor circuit for the four pole motor 1.

For attaching the first stack of laminations 3 to each of the second stack of laminations 37, 37 in the FIGS. 1–7 embodiment, the outer free extremities of each of the upper pair of stacked side legs 7, 7, as seen in FIG. 3 of the drawings, are each provided with an outwardly extending male tab 39 for complementary reception within a complementary shaped recess or opening 41 formed in the upper second stack of laminations 37. The lower pair of each of the stacked side legs 7, 7 on the opposite side of the four pole central portion 5 in the FIG. 3 illustration, each have a recess or opening 41 formed in the outer free extremity of each of the stacked side legs 7, 7 for complementary reception of one of the spaced male tabs 39, 39 formed in the lower second stack of laminations 37.

As best illustrated in FIGS. 1–2, 4 and 7 of the drawings, it will be noted that when each of the insulating bobbins 33 with wound electrically conductive coil or wire 35 are mounted on each of the stacked side legs 7 of the first stack of laminations 3, each electrically conductive coil 35 is mounted in close proximity to one motor pole 21, the aligned rotor opening 9 of the first stack of laminations and the rotor 11. Each electrically conductive wire 35 forming each electrically conductive coil 35 has less than one-half the length of an electrically conductive wire forming a single electrically conductive coil in an equivalent magnetic inductor circuit. The use of less than one-half of the length for each electrically conductive coil 35 mounted on the side legs 7, 7, as compared to the length of a single electrically conductive coil, is due to the longer length and smaller mean diameter of each pair of electrically conductive coils 35 positioned in the spaced side legs 7, 7, as compared to a single electrically conductive coil in a conventional construction.

Additionally, the electrically conductive wire forming each electrically conductive coil 35 may also have a smaller diameter. The reduction in the diameter of the electrically conductive wire forming each electrically conductive coil 35 is believed due to the shorter wire length of each electrically conductive coil 25, the greater winding surface area of each electrically conductive coil 35 and the proximate location of the spaced electrically conductive coils 35 on the spaced pairs of side legs 7, 7 on each side of the central portion 5 relative to the four poles 21, aligned rotor opening 9 and rotor 11.

It is also believed that the greater cross sectional area of the legs 7 in the new and improved construction, even where there is substantial savings in lamination material, may provide a greater and/or more efficient flow magnetic flux than the aforementioned prior art four pole motors. Greater overall efficiency may also be achieved in spite of the substantial reduction in the amount of material required for the electrically conductive coil 35, whether or not the combined predetermined outer cross sectional configuration of each of the stacked legs 7 have a four-sided (square or rectangular) configuration or a higher order greater than four sides outer cross sectional shape.

The embodiment of FIGS. 8–11 illustrate a four-sided construction for the spaced legs 7, 7 of the four pole motor 51. The motor 51 is similar in all respects to the motor 1 of the FIGS. 1–7 embodiment with the following differences. First, each of the stacked side legs 7, 7 on each side of the stacked central portion 5 in the first stack of laminations 3 have a combined predetermined outer cross sectional configuration coil winding area that is of the typical four-sided (square or rectangular) shape. This enables an insulating bobbin 53 with wound electrically conductive coil or wire 55 having a corresponding four-sided shape to be mounted over the four-sided outer cross sectional configuration coil winding area 27 of each of the stacked side legs 7, 7 on each side of the four pole central portion 5.

Except for the extra wire savings achieved in the FIGS. 1–7 embodiment due to the higher order greater than four sides outer cross sectional shape as compared to the four-sided shape of FIGS. 8–11, it has been found that the FIGS. 8–11 construction retains all of the other substantial cost reductions in the same manner at the FIGS. 1–7 embodiment, when compared to prior art four pole motors.

In either or both of the FIGS. 1–7 or 8–11 embodiments, a further modification of the motors 1 or 51 may be achieved through the use of the insulating bobbin assembly 61 illustrated in FIGS. 12–14 shown in conjunction with the motor 1 embodiment. The insulating bobbin assembly 61 includes a pair of spaced insulating bobbins 63, 63 that are adapted to be wound with an electrically conductive coil or wire 65 for mounting over the spaced stack legs 7, 7 on each side of the four pole central portion 5. In this particular embodiment; however, the spaced pair of insulating bobbins 63, 63 are integrally connected to one another across a living foldable hinge 67 as a one-piece injection molded product.

The spaced pair of insulating bobbins 63, 63 are positioned and maintained in longitudinally axially aligned relationship during the winding of an electrically conductive wire 65 about each bobbin 63, as illustrated in FIG. 13 of the drawings. For this purpose, each insulating bobbin 63 includes an end aperture 69 through which the electrically conductive wire 65 extends between the insulating bobbins 63, 63. The electrically conductive wire 65 is also positioned over the living foldable hinge 67 to enable a single electrically conductive wire to be used for both of the spaced insulating bobbins 63, 63. As will be appreciated, this reduces the amount of terminal connections required, thus saving further material and manufacturing costs.

Once the spaced insulating bobbins 63, 63 are wound with the desired amount of electrically conductive wire 65, the spaced pair of insulating bobbins 63, 63 are folded about the living foldable hinge 67 in order to position the longitudinal axes of the spaced bobbins 63, 63 in generally parallel relationship for mounting over the spaced side legs 7, 7 on each side of the four pole central portion 5 of the first stack of laminations 3. This relative position of the spaced insulating bobbins 63, 63 is best illustrated in FIG. 14 of the drawings, with the living foldable hinge 67 permitting the integrally connected pair of bobbins 63, 63 to be moved to the illustrated position. The same position is illustrated in FIG. 12 of the drawings where the insulating bobbin assembly is shown as being mounted over the spaced stack legs 7, 7 on each side of the four pole central portion 5. The insulating bobbin assembly 61 not only facilitates the winding of a single electrically conductive wire 65 on the spaced interconnected insulating bobbins 63, 63, but further facilitates the joint assembly and mounting of the spaced insulating bobbins 63, 63 relative to the spaced leg 7, 7 on each side of the four pole central portion 5 of the first stack of laminations 3, as will be appreciated.

It will be noted in FIG. 12 of the drawings that the electrically conductive wire 65 wound on each pair of spaced interconnected bobbins 63, 63 also extends between and is integrally interconnected between the spaced interconnected bobbins 63, 63. In this regard, it will be seen that integral wire extension 66 of the electrically conductive wire between the spaced interconnected bobbins 63, 63 is received within an opening 68 of the spaced interconnected bobbins 63, 63.

The electrically conductive wire 65 wound about each of the upper and lower bobbins 63, 63 at the right side of FIG. 12 are illustrated as being connected to a wire terminal 70 for connection to a power source. At the left hand side of FIG. 12, the electrically conductive wire 65 wound about upper and lower bobbins 63, 63 is connected to a protector 72 through extended wires 74, 74. The protector 72 is a temperature sensor that is pre-set to interrupt the electrically conductive circuit at a predetermined temperature in the even excessive heat is caused by rotor locking or other difficulties.

The method of forming base and end leg laminations of the type illustrated in FIGS. 1–7 of the drawings can best be understood by reference to FIGS. 15–16 of the drawings. FIG. 15 shows the die layout used in the method of manufacturing base and end leg laminations in the FIGS. 1–7 embodiment while FIG. 16 is a top plan schematic view depicting the various steps in the manufacturing method for producing the base and end leg laminations of the FIGS. 1–7 embodiment. As illustrated in FIG. 15, the die layout shows two rows of base laminations 3, each lamination 3 having spaced side legs 7, 7 on opposite sides of the four pole central portion 5 as extending longitudinally with one of the separate end leg laminations 37 formed between opposed pairs of spaced legs 7, 7 in adjacent base laminations 3, 3. At the outer free extremity of one end of one of the spaced pairs of legs 7, 7, there is a male fastening tab 39, while the outer free extremity of the second pair of spaced legs 7, 7 on an opposite side of the four pole central portion 5 is provided with complementary shaped female recesses 41, 41. This pattern repeats throughout the die layout, thus facilitating stacking of adjacent formed base laminations 3 in a desired pattern. End leg laminations 37 formed between spaced pairs of legs 7, 7 of adjacent base laminations 3, 3 are provided with spaced male fastening tabs 39, 39 for complementary fastening engagement with female fastening recesses 41, 41 at one end of each of the base laminations 3. Second end leg laminations 37 are also illustrated as being formed between the two rows of base laminations 3, 3, the separate end leg lamination 37 being provided with spaced female recesses 41, 41 for cooperative fastening interengagement with male fastening tabs 39, 39 at an opposite end of each of the base laminations 3. It will be appreciated that adjacent laminations could be spaced apart a sufficient distance to enable a pair of laminations 37, 37, each being provided with spaced female recesses 41, 41, to be formed in the two rows of base laminations between adjacent laminations in each row. Alternatively, the end leg laminations with female recesses 41, 41 can be formed from a separate strip, if desired.

Reference is now made to FIG. 16 of the drawings for an illustration of the manner in which the laminations 3 shown in FIG. 15 are formed. To facilitate understanding of the manufacturing process, only one row of base laminations 3 are illustrated. In accordance with the method of the present invention, an elongated strip of magnetically conductive coil stock 81 is fed from left to right as illustrated by the arrow at the left hand side of FIG. 16. The coil stock 81 is progressively fed, by well known stock feeding mechanisms (not shown) through various stages or stations forming a progressive punching or stamping system. The stages or stations in the manufacturing method are shown in FIG. 16 of the drawings as representing the various punching or stamping stages or stations that operate on the coil stock 81.

As viewed from the left to right in FIG. 16 of the drawings, the successive series of die cutting or stamping steps first includes the forming of a rotor opening 9 which also produces the rotor lamination 11 shown to the left side of the coil stock 81. At the same time, the separate end leg laminations 37, which are longitudinally aligned with the coil stock 81, are also formed resulting in the formation of an end leg lamination opening 38 along a central portion of the elongated strip 81. It will be understood that the formation of the rotor opening 9 and the end leg lamination opening 38 do not otherwise interfere with the subsequent forming of the laminations 3 in the successive series of steps now to be described.

At the next station or stage, a movable die set D1 moves to the left relative to the coil stock 81. The movable die set D1 is moved by a controller (not shown) which moves the die set D1 a predetermined amount, following which punching takes place to remove an elongated scrap piece 83 from the right hand side of the elongated strip 81 leaving the U-shaped opening 84 while, at the same time, removing the scrap piece 85 adjacent to the longitudinally extending end leg opening 38, in order to form the enlarged opening 86 in the elongated strip.

At the next station, the movable die section D2 is moved by a controller (not shown) to the right as illustrated by the arrow, following which punching takes place to remove the scrap piece 87 from the left hand side of the strip 81 to form the left U-shaped opening 88 and the additional scrap piece 89 is removed from the elongated strip 81 adjacent to the longitudinally extending end leg opening 38 on an opposite side from the scrap piece 85 previously formed, in order to produce the enlarged opening 90.

It will be understood that the movable die sections D1 and D2 are designed to move predetermined amounts depending upon the desired width of the spaced legs 7, 7 in forming the incremental stair-stepped generally circular outer cross sectional configuration 27, as illustrated in FIGS. 1–7. While the method and apparatus for accomplishing this is no part by itself of the present invention, reference is made to copending patent application U.S. Ser. No. 08/372,035 filed Jan. 12, 1995 entitled CONTROLLED ADJUSTABLE MANUFACTURING METHOD AND APPARATUS FOR VARIABLE LAMINATIONS USED IN ELECTROMAGNETIC INDUCTION DEVICES for a specific description of the manner in which various adjustable widths can be formed in adjacent laminations to produce the incremental stair-stepped generally circular outer cross sectional shape for the spaced stack legs 7, 7 on each side of the four pole central portion 5 of the first stack of laminations 3.

The final stage in the method illustrated in FIG. 16 of the drawings shows each lamination 3 being stamped from the elongated strip 81. Each of the laminations 3 will then be fed to separate stacks where the laminations are accumulated and stacked to produce the desired motor construction. The separate end leg lamination 37 formed in the first stage or station will be fed to an appropriate area for stacked accumulation and subsequent mating with the corresponding female fastening recesses at one end of the stacked legs 7, 7 of the laminations 3. A separate end leg lamination 37 may be formed either with the elongated strip, as shown in FIG. 15, or in a separate elongated strip. In any event, such separate end leg laminations with female fastening recesses will be mated with the male fastening tabs at one end of the spaced legs 7, 7 of the laminations 3.

In some instances, it may be desirable to form both the separate end leg laminations 37, 37 from the elongated strip between the opposed and spaced side legs 7, 7 of adjacent base laminations 3, 3. A suitable die layout for this purpose is illustrated in FIG. 19 of the drawings. In order to accomplish this, the spaced side legs 7, 7 of each lamination 3 on opposite sides of the four pole central portion 5 must be spaced apart a further distance from one another, as illustrated in FIG. 19 of the drawings. This produces a motor 101 of the type shown in FIG. 19 of the drawings which is similar in all respects to the motor illustrated in FIGS. 1–7 of the drawings with the exception that the spaced and stacked side legs 7, 7 on each side of the four pole central portion 5 are spaced apart a distance greater than the FIGS. 1–7 embodiment in order to produce the pair of spaced end leg laminations 37, 37 between the spaced legs 7, 7 of adjacent laminations 3, 3. It will be apparent that while this will provide savings in the manufacturing method, it may not result in the desirable horsepower output for the motor 101 since the magnetic inductor circuit is enlarged.

There is one further difference in that the pair of separate end leg laminations 37, 37 each have alternate male and female fastening elements 39, 41. This alternate male/female fastening element 39, 41 for each separate end leg lamination 37 corresponds to the male and female fastening elements 39, 41 formed at the outer free extremities of spaced stacked legs 7, 7 on each side of the four pole central portion 5, as illustrated in FIG. 19 of the drawings. As will be appreciated, this alternate male/female fastening construction for each of the end leg laminations 37 enables both of the end leg laminations to be formed between the spaced side legs of adjacent base laminations 3 that are being formed from an elongated strip.

This same alternate male/female fastening element construction may be used in forming base laminations where the spaced side legs have the typical four-sided (square or rectangular) configuration. This is illustrated in FIGS. 20–21 of the drawings. The FIG. 20 die layout shows the spaced side legs 7, 7 on each side of the four pole central portion 5 as having the same width in order to produce a combined predetermined outer cross sectional configuration of four-sided (square or rectangular) shape. Between spaced side legs 7, 7 of adjacent laminations 3, the separate end leg laminations 37, 37 may be formed. In this instance as well, each of the end leg laminations 37, 37 have one male fastening tab and one female fastening recess 39, 41, respectively.

Since the process for making the four-sided side legs 7, 7 of the laminations 3 does not require incremental movement of independent die sets D1, D2 as in the previous method, the method is much simpler. This is illustrated in FIG. 21 of the drawings where the elongated strip of magnetically conductive material 91 is fed from left to right as indicated by the arrow to the left hand side of FIG. 21. In the first station, a rotor opening 9 is formed in the strip producing a rotor lamination 11. Also at the same time, the cooperating pair of separate end leg laminations 37, 37 are formed, one being deposited to the left hand side of the elongated strip 91, while the other is positioned to the right hand side of the strip 91. This leaves the end leg lamination opening 92 in the elongated strip 91. At the second station or stage, scrap comer pieces 93 are removed from all four comers adjacent the end leg lamination opening 92 in order to produce the generally rectangular shaped opening 94. At the next station, each end leg lamination 3 is separated from the remainder of the strip and then fed to a suitable location for stacked accumulation. As will be appreciated, the process for producing the base laminations 3 and end leg laminations 37, 37 in the FIGS. 20–21 method is a much simpler method for producing laminations than that described in connection with the method of FIGS. 16–17 of the drawings.

In lieu of attaching the side legs 7, 7 to the central portion 5 and securing separate end legs 37 to the outer free extremities of the side legs 7, 7, FIGS. 22–23 show a modified four pole motor 78 where U-shaped laminations 80 are formed with the end legs 37 integrally attached to the side legs 7, 7. The outer free ends of such side legs 7, 7 are provided with complementary male/female elements 39, 41 for complementary fastening engagement with female/male elements 41, 39 on opposite sides of the central portion 5.

Figure 25:
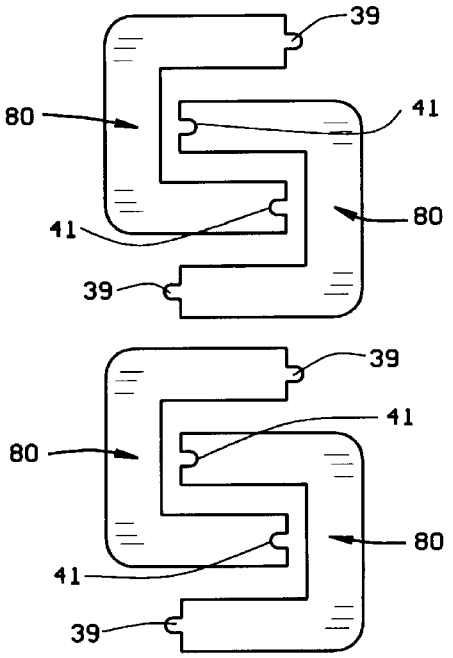
FIG. 25 is a top plan view of the die layout for forming the U-shaped laminations used in the FIG. 22 motor.

The method of forming the FIGS. 22–23 modified four pole motor 78 is best illustrated in FIGS. 24–25 of the drawings. The base laminations 82 are formed with a central portion 5 having a rotor opening 9. The base laminations 82 are formed in a strip with complementary mating male/female elements 39, 41 between adjacent base laminations 82. The U-shaped laminations 80 are illustrated as being formed in FIG. 25 from a strip of material in adjacent nested relationship, is illustrated. Subsequently, the base laminations 82 and U-shaped laminations 80 are stacked, electrical coils 35 are positioned over the spaced legs 7, 7, and the U-shaped laminations 80 are attached to the base laminations 82 as illustrated in FIGS. 22–23.

In all of the previous four pole motor constructions and methods of manufacture, the four pole motor constructions were illustrated as being of the double twin bobbin four pole motor variety. In the four pole motor embodiment illustrated in FIGS. 26–27 of the drawings and the related method as illustrated in FIG. 28 of the drawings, the four pole motor is a twin bobbin four pole motor where the twin bobbins are not mounted on the spaced side legs of the base laminations, but rather on the separate end leg laminations that are attached to the free ends of the spaced side legs of the base lamination.

Figure 26:
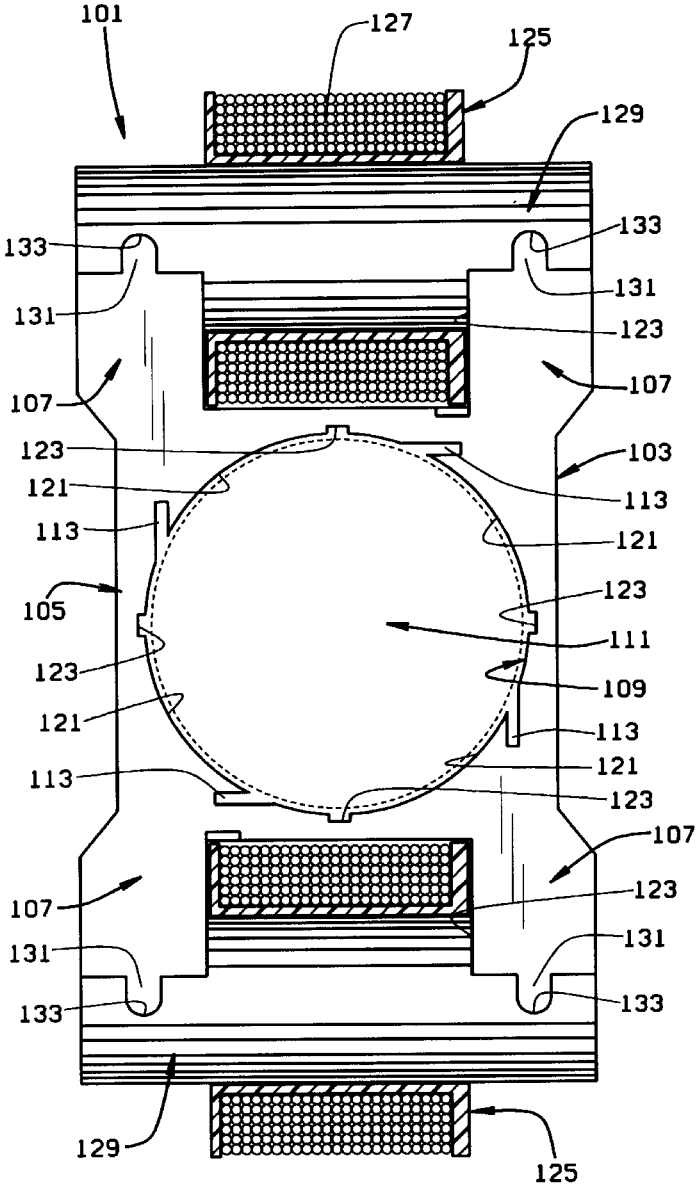
FIG. 26 is a side elevational view of another modified twin bobbin four pole motor having opposed twin bobbins at opposite ends of the motor.
Figure 27:
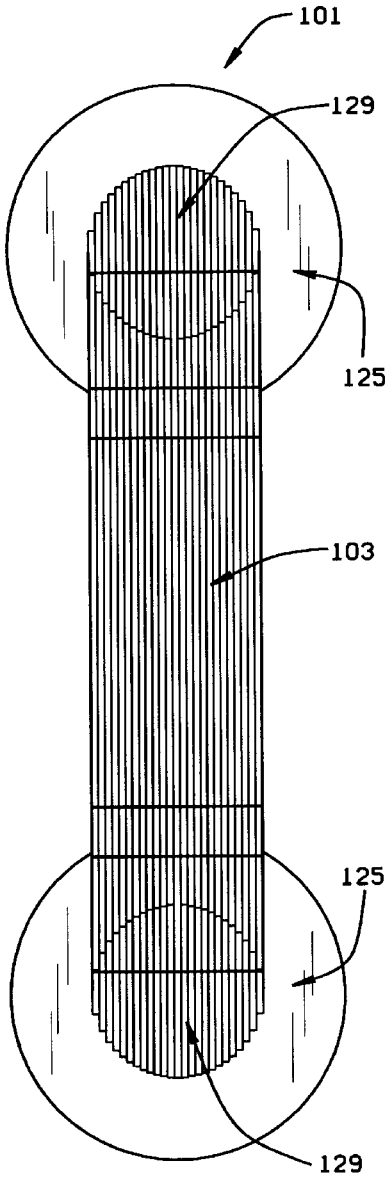
FIG. 27 is an end elevational view of the modified four pole motor shown in FIG. 26.

This is best illustrated in FIGS. 26–27 of the drawings where the motor 101 is illustrated as having a series of stacked base or stator laminations 103. Each of the stator laminations 103 have a four pole central portion 105 with spaced side legs 107, 107 extending on opposite sides of the central portion. A rotor opening 109 is formed in the four pole central portion 105 for receiving the rotor 111, as illustrated. The four slots 113 form the adjacent rotor opening 109 are used for the insertion of shading copper (not shown) along the lines of the FIGS. 1–7 and 8–11 embodiments. Four poles 121 are separated by four reluctance gaps 123 positioned at the 0°, 90°, 180°, and 270° positions around the opening 109, as illustrated. Thus, the rotor 111 rotates with respect to the four poles 121 in a manner similar to the FIGS. 1–7 and 8–11 embodiments.

Each of the stacked stator or base laminations 103 include a pair of U-shaped openings 123, 123 at opposite ends thereof between each pair of spaced side legs 107, 107 on each side of the four pole central portion 105. The U-shaped openings 123, 123 each receive bobbins 125 with wound electrically conductive coil 127 that are mounted on the stacked coil winding laminations 129, each of which collectively have a combined generally circular outer cross sectional shape, as illustrated in FIG. 27 for receiving complementary shaped bobbins 125 about which the electrically conductive coil 127 is wound. As in the previous embodiments, the electrically conductive coil 127 is layer wound in closely packed relationship in a series of superimposed rows, as described in my aforementioned copending patent applications. The opposite free extremities of the spaced stack legs 107, 107 include spaced male bosses 131, 131 for complementary cooperative fastening interconnection relative to spaced female openings 133, 133 formed in the separate stacked coil winding laminations 129. It will now be apparent that the four pole motor 101 thus includes spaced twin bobbins mounted on the separate end leg or coil winding laminations 129, 129 at opposite ends of the motor in the manner best illustrated in FIGS. 26–27 of the drawings.

Figure 28:
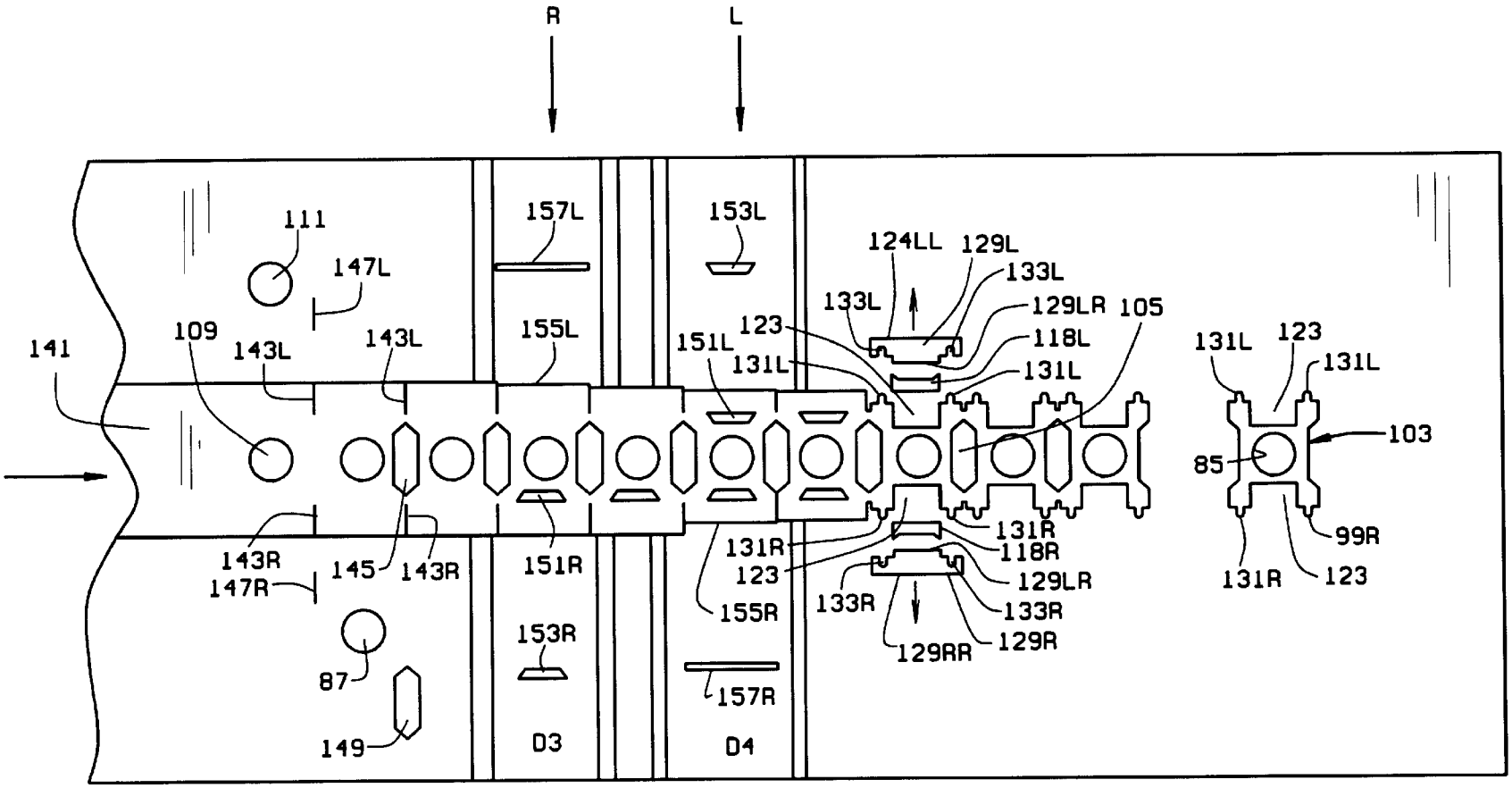
FIG. 28 is a top plan view of a punching or stamping die layout used in the manufacture of laminations for the FIGS. 26–27 embodiment.

For the manufacture of the four pole motor 101 illustrated in FIGS. 26–27 of the drawings, reference is made to FIG. 28 which shows an elongated strip of magnetically conductive coil stock material 141 that is indexed through various workstations for progressively stamping various configurations in the coil stock 141, in a manner similar to the method described in detail in copending patent application U.S. Ser. No. 08/372,035 filed Jan. 12, 1995 entitled CONTROLLED ADJUSTABLE MANUFACTURING METHOD AND APPARATUS FOR VARIABLE LAMINATIONS USED IN ELECTRO-MAGNETIC INDUCTION DEVICES. With respect to the FIG. 28 method, the coil stock 141 is initially stamped or punched with the rotor opening 109, resulting in the rotor slug or lamination 111 that forms the rotor 111 when a series of corresponding slugs or laminations are stacked together. Spaced notches 143L, 143L to the left and 143R, 143R to the right of the coil stock 141 are formed in alignment with pointed triangular ends of the rectangular slot with triangular ends 145 that is punched in the coil stock 141 to thus define each base or stator lamination 103 to be formed. Scrap 147L, 147R comes from the notches 143L, 143R while scrap piece 149 comes from the rectangular slot with triangular ends 145.

The next step in the progressive stamping or punching system includes movement by the movable die D3 which is moved to the right as shown by the right arrow R. This movement to the right is produced by a controller (not shown) for forming a trapezoidal opening 151R producing trapezoidal scrap piece 153R. The right side of the trapezoidal opening 151R forms the left side 129RL of the coil winding lamination 129R. At the same time, the wide notch 155L is formed in the left side of the lamination 103 which forms the left side 129LL for the left coil winding lamination 129L. Notch section 157L is produced by forming the wide notch 155L.

The next movable die section D4 is moved by the controller (not shown) to the left, as shown by the left arrow L, causing the wide notch 155R to be formed to the right side of the lamination 103 which forms the right side 129RR of the coil winding lamination 129R. The wide notch 155R produces the scrap notch section 157R to the right side of the coil stock 141, as shown. At the same time, a trapezoidal opening 151L is formed to the left side of the lamination 103, the longer side of the trapezoid forming the right side 129LR of the left coil winding lamination 129L.

The next die section blanks out the right and left coil winding laminations 129R, 129L, respectively, as well as blanking out the three sides of the U-shaped opening 123 on the left and right sides of the lamination 103.

In the forming of the right coil winding laminations 129R, spaced openings 133R, 133R are formed in the right coil winding laminations 129R while corresponding male fastening tabs 131R, 131R are formed in the right side of the lamination 103. Similarly, spaced openings 133L, 133L are formed in the left coil winding lamination 129L with corresponding male fastening tabs 131L, 131L formed in the left side of the lamination 103.

As explained in my aforementioned copending patent application U.S. Ser. No. 08/372,035 filed Jan. 12, 1995 entitled CONTROLLED ADJUSTABLE MANUFACTURING METHOD AND APPARATUS FOR VARIABLE LAMINATIONS USED IN ELECTRO-MAGNETIC INDUCTION DEVICES, each controller is programmed to produce the coil winding laminations 129 with predetermined incrementally varying widths such that when stacked, the combined configuration of the stacked coil winding laminations 129 have a generally circular outer cross sectional shape, at least along opposed sections thereof, as illustrated in FIGS. 26–27 of the drawings. Following the stacking of the stator or base laminations 103 and the spaced separate coil winding laminations 129, 129 as described above, the assembly of same relative to each insulating bobbin 125 with wound electrically conductive coil 127 is then effected, following which the coil winding laminations 129, 129 are secured through the complementary male and female fastening elements 131, 133 at opposite ends of the stacked stator or base laminations 103. This results in the four pole motor 141.

While the preferred construction includes spaced twin bobbins each wound with an electrically conductive coil on opposite sides of a four pole central portion, it is possible to use only one such electrically conductive coil on a single stack leg on opposite sides of the four pole central portion. Furthermore, while the spaced twin bobbins in the preferred construction each preferably has an electrically conductive coil with less than one-half of the electrically conductive wire of a single electrically conductive coil in an equivalent magnetic inductor circuit, one electrically conductive coil may have less than one-half of the electrically conductive wire while another electrically conductive coil in the twin bobbin construction may have more than one-half of the electrically conductive wire. Additionally, electrically conductive coils that are gear wound on split bobbins may be used in lieu of the preferred solid bobbin constructions disclosed above, as previously illustrated and described in some of my aforementioned patent applications.

The electrical operation of the various motor embodiments can best be understood by reference to FIG. 12 of the drawings which shows the motor polrity and flux path. The polarity at a first end of each of the legs 7, 7, 7, 7, where such legs are attached at circumferentially spaced areas to the four pole central portion 5 that contains the rotor opening 9, are of opposite alternating polarity around the central portion 5. As a result, the free extremities of the legs 7, 7, 7, 7 at a second end are of opposite polarity to the first end of such legs. The coils 61, 61, 61, 61 are connected in series as shown and as previously described, and therefore are in flux generation in the flux pattern through the four coils 61, 61, 61, 61 is shown by the single continuous flux path F. As will be appreciated, the connected in series coils 61, 61, 61, 61 push and pull the flux F through the rotor 11. Each pair of coils 61, 61, on opposite sides of the central portion 5, also produces a separate flux path F1 and F2 which assists in pushing and pulling flux through the rotor 11. The operating efficiency of the motor of the present invention, including the efficient flow of flux in the flux path F, will be enhanced for the reasons discussed above.

From the foregoing, it will now be appreciated that the present invention discloses several different and novel twin bobbin four pole motor constructions that provide substantial material savings as compared with prior art designs. At the same time, the substantial reduction in motor material costs does not affect the operating performance or efficiency, but rather, even with substantial material savings, there can be improved operating efficiency over prior art designs. In addition, the novel methods of manufacturing the various four pole motor embodiments disclosed illustrates new and improved methods for achieving optimal manufacturing performance while producing four pole motor constructions having the improved savings and operating efficiency, as discussed above.

In view of the above, it will be seen that the several objects and advantages of the present invention have been achieved and other advantageous results have been obtained.

As various changes could be made in the above constructions or methods without departing from the scope of the invention, it is intended that all matter contained in the above description or shown in the accompanying drawings shall be interpreted as illustrative and not in a limiting sense.

I claim:

1. A four pole motor comprising:

magnetically conductive stacked laminations each having a one-piece four pole central portion with a rotor opening and two spaced pairs of side legs, each spaced pair of side legs being connected to and extending from circumferentially spaced areas of the central portion on opposite sides of the central portion generally in mirror image relationship with one another, each of the spaced pair of side legs being connected at a first end to one circumferentially spaced area and being connected at a second end opposite from said central portion to an end leg, the combined stacked laminations providing spaced pairs of stacked side legs connected to stacked end legs on opposite sides of stacked central portions having aligned rotor openings for receiving a rotor;

the first end of each of said stacked side legs at its associated circumferentially spaced area around the central portion having a different polarity from each adjacent stacked side leg in order to provide an alternating polarity of four poles around the central portion, the second end of each stacked side leg having a different polarity than its first end;

each of the stacked side legs and stacked end legs having combined predetermined outer cross sectional configurations;

at least one electrically conductive coil positioned about the combined predetermined outer cross sectional configuration of at least one of said stacked side legs or stacked end legs on each side of said central portion; and each of the electrically conductive coils being connected [in series with one another] *to aid one another in pushing and pulling flux through the rotor*.

2. The four pole motor as defined in claim 1 wherein the combined predetermined outer cross sectional configuration of each of said stacked side legs or stacked end legs receiving an electrically conductive coil having a four-sided outer cross sectional shape and each electrically conductive coil having a corresponding shape.

3. The four pole motor as defined in claim 1 wherein the combined predetermined outer cross sectional configuration of each of said stacked side legs or stacked end legs receiving an electrically conductive coil having a higher order greater than four sides outer cross sectional shape, and each said electrically conductive coil having has a corresponding shape.

4. The four pole motor as defined in claim 1 wherein each of said spaced pairs of side legs are integrally attached to said central portion.

5. The four pole motor as defined in claim 1 wherein each of said spaced pairs of side legs are integrally attached to an end leg.

6. A four pole motor comprising:

magnetically conductive stacked laminations each having a one-piece four pole central portion with a rotor opening and two spaced pairs of side legs, each spaced pair of side legs extending from circumferentially spaced areas of the central portion on opposite sides of the central portion generally in mirror image relationship with one another, each side leg being connected at one end to one circumferentially spaced area of the central portion and terminating in an outer free extremity at a second end, the combined stacked laminations providing spaced pairs of stacked side legs on opposite sides of stacked central portions having aligned rotor openings for receiving a rotor;

the first end of each of said stacked side legs at its associated circumferentially spaced area around the central portion having a different polarity from each adjacent stacked side leg in order to provide an alternating polarity of four poles around the central portion, the second end of each stacked side leg having a different polarity than its first end;

each of the stacked side legs of said stacked spaced pairs of side legs having a combined predetermined outer cross sectional coil winding area;

an electrically conductive coil positioned about the coil winding area of at least one of the stacked side legs on each side of the central portion;

separate magnetically conductive stacked laminations for attachment to the outer free extremities of each pair of stacked side legs; and each of the electrically conductive coils being connected [in series with one another] *to aid one another in pushing and pulling flux through the rotor*.

7. The four pole motor as defined in claim 6 wherein there are electrically conductive coils positioned about the coil winding area of each of the stacked side legs.

8. The four pole motor as defined in claim 7 wherein the combined predetermined outer cross sectional coil winding area of each of said stacked side legs has a four-sided outer cross sectional shape and each electrically conductive coil positioned about each of the stacked side legs has a corresponding shape.

9. The four pole motor as defined in claim 7 wherein the combined predetermined outer cross sectional coil winding area of each of said stacked side legs has a higher order greater than four sides outer cross sectional configuration and each said electrically conductive coil positioned about each of the stacked side legs has a corresponding shape.

10. The four pole motor as defined in claim 6 wherein the separate magnetically conductive stacked laminations are end leg laminations for attachment to the outer free extremity of each pair of stacked side legs through complementary shaped fastening elements.

11. The four pole motor as defined in claim 10 wherein male fastening elements are formed at the outer free extremity of one pair of spaced side legs and female fastening elements are formed at the outer free extremities of the other pair of spaced side legs for attachment to complementary fastening elements of associated separate end leg laminations.

12. A multi-pole motor comprising:

magnetically conductive stacked laminations each [have] *having* a one-piece multi-pole central portion with a rotor opening and at least two spaced pairs of side legs, each spaced pair of side legs extending from circumferentially spaced areas of the central portion around the central portion, each side leg being connected at one end to one circumferentially spaced area of the central portion and terminating in an outer free extremity at a second end, the combined stacked laminations providing stacked side legs and stacked central portions having an aligned rotor opening for receiving a rotor;

the first end of each of said stacked side legs at its associated circumferentially spaced area around the central portion having a different polarity from each adjacent stacked side leg in order to provide an alternating polarity of *four* poles around the central portion, the second end of each stacked side leg having a different polarity than its first end;

each of the stacked side legs of said stacked laminations having a combined coil winding area of predetermined outer cross sectional shape;

an electrically conductive coil positioned about the combined coil winding area of each of the stacked side legs, each of the electrically conductive coils being connected [in series with one another] *to aid one another in pushing and pulling flux through the rotor*; and separate magnetically conductive stacked end leg laminations for attachment to the outer free extremities of each pair of stacked side legs.

13. The multi-pole motor as defined in claim 12 wherein one end of each coil winding area is in immediate proximity to the aligned rotor openings and rotor.

14. The multi-pole motor as defined in claim 13 wherein an electrically conductive wire forms each electrically conductive coil and is layer wound in closely packed relationship in a plurality of juxtaposed rows in its positioned relationship on each said predetermined outer cross sectional shape.

15. The multi-pole motor as defined in claim 14 wherein an insulating bobbin with wound electrically conductive coil is positioned on each said combined coil winding area of predetermined outer cross sectional shape.

16. The multi-pole motor as defined in claim 12 wherein an electrically conductive wire forming said electrically conductive coil around at least one of said stacked side legs has a predetermined winding length, predetermined mean winding diameter, and predetermined wire diameter that can be varied to achieve desired operating efficiency and cost.

17. The multi-pole motor as defined in claim 16 wherein an electrically conductive wire is wound about each insulating bobbin to form an electrically conductive coil that is positioned about each of said stacked side legs.

18. A four pole motor comprising:

magnetically conductive stacked laminations each [have] *having* a one-piece four pole central portion with a rotor opening and two pairs of side legs, each spaced pair of side legs extending from circumferentially spaced areas of the central portion on opposite sides of the central portion generally in mirror image relationship with one another, each side leg being connected at one end to one circumferentially spaced area and terminating in an outer free extremity at a second end, the combined stacked laminations providing spaced pairs of stacked side legs on opposite sides of stacked central portions having aligned rotor openings for receiving a rotor;

the first end of each of said stacked side legs at its associated circumferentially spaced area around the central portion having a different polarity from each adjacent stacked side leg at its associated circumferentially spaced area in order to provide an alternating polarity of four poles around the central portion, the second end of each stacked side leg having a different polarity than its first end;

each of the stacked side legs of said stacked laminations having a combined predetermined outer cross sectional coil winding area;

an insulating bobbin with wound electrically conductive coil positioned about each of said stacked side legs, each electrically conductive coil being connected [in series with one another] *to aid one another in pushing and pulling flux through the rotor*;

spaced pairs of insulating bobbins positioned about the spaced and stacked side legs on each side of said stacked central portions and being integrally connected to one another while the associated wound electrically conductive coils of said pair of insulating bobbins comprises one electrically conductive wire that is integrally and electrically connected and wound about each said pair of insulating bobbins; and separate magnetically conductive stacked end leg laminations for attachment to the outer free extremities of each pair of stacked side legs.

19. The four pole motor as defined in claim 18 wherein the combined predetermined outer cross sectional coil winding area of each of said stacked legs has a four-sided outer cross sectional shape and each electrically conductive coil positioned about each of the stacked side legs has a corresponding shape.

20. The four pole motor as defined in claim 18 wherein the combined predetermined outer cross sectional coil winding area of each of said stacked legs has a higher order greater than four sides outer cross sectional configuration and each said electrically conductive coil positioned about each of the stacked side legs has a corresponding shape.

21. A four pole motor comprising:

magnetically conductive stacked laminations each having a one-piece four pole central portion with adjacent poles of different polarity around the central portion and a rotor opening in the four pole central portion, the combined stacked laminations having aligned rotor openings for receiving a rotor;

separate magnetically conductive stacked U-shaped laminations each having an end leg and spaced pairs of side legs, the combined stacked U-shaped laminations having stacked end legs and spaced pairs of stacked side legs which terminate in outer free extremities;

each of said stacked end legs and stacked side legs of said U-shaped laminations having a combined predetermined outer cross sectional coil winding area;

at least one electrically conductive coil positioned about the coil winding area of at least one of said stacked end legs or stacked side legs; and opposed pairs of stacked U-shaped laminations in mirror image relationship to one another and being attached through the outer free extremities of said spaced pairs of side legs on opposite sides of said four pole central portion.

22. The four pole motor as defined in claim 21 wherein an electrically conductive coil is mounted about the stacked end legs of each of said stacked U-shaped laminations.

23. The four pole motor as defined in claim 21 wherein an electrically conductive coil is positioned over each of the spaced stacked side legs of each of said stacked U-shaped laminations.

24. A four pole motor comprising:

magnetically conductive stacked laminations each having an end leg integral with a spaced pair of side legs that extend from opposite sides of said end leg generally in mirror image relationship to one another, each of said side legs at its integral attachment to the end leg having a first end of different polarity than an adjacent side leg at its integral attachment to the *end* leg and terminating in an outer free extremity at a second end of different polarity than the first end, adjacent laminations being stacked to provide combined stacked end legs and spaced pairs of side legs having a predetermined stacked configuration;

a rotor opening provided in the end leg of each lamination that is aligned with the rotor openings of adjacent stacked end legs to provide an aligned rotor opening in the stacked end legs for receiving a rotor;

each of the stacked side legs having a combined predetermined outer cross sectional coil winding area;

an electrically conductive wire forming an electrically conductive coil positioned about the coil winding area of the stacked side legs with each electrically conductive coil connected [in series to one another] *to aid one another in pushing and pulling flux through the rotor*, each electrically conductive wire in each electrically conductive coil positioned about at least one stacked side leg having a predetermined winding length, predetermined mean winding diameter and predetermined wire thickness to achieve desired operating efficiency and cost; and separate magnetically conductive stacked end leg laminations for association with the outer free extremity of each pair of stacked and spaced side legs in order to complete a magnetic inductor circuit through each separate stacked end leg lamination and associated stacked and spaced side legs and integral end leg including aligned rotor opening and associated rotor.

25. The four pole motor as defined in claim 24 wherein each of the electrically conductive coils when positioned about each of the stacked side legs are positioned with one end in immediate proximity to the aligned rotor openings of said stacked integral end legs and said rotor.

26. The four pole motor as defined in claim 25 wherein each electrically conductive wire of each electrically conductive coil is wound about an insulating bobbin.

27. A four pole motor comprising:

magnetically conductive stacked laminations each having a one-piece four pole central portion with a rotor opening and two pairs of side legs, each spaced pair of side legs extending from circumferentially spaced areas of the central portion on opposite sides of the central portion generally in mirror image relationship with one another, each side leg being connected at one end to one circumferentially spaced area of the central portion and terminating in an outer free extremity at a second end, the combined stacked laminations providing spaced pairs of stacked side legs on opposite sides of stacked central portions having aligned rotor openings for receiving a rotor;

the first end of each of said stacked side legs at its associated circumferentially spaced area around the central portion having a different polarity from each adjacent stacked side leg at its associated circumferentially spaced area in order to provide an alternating polarity of four poles around the central portion, the second end of each stacked side leg having a different polarity than its first end;

separate magnetically conductive stacked laminations for attachment to the outer free extremities of each pair of stacked side legs;

each of said separate magnetically conductive stacked laminations having a combined predetermined outer cross sectional coil winding area;

an electrically conductive coil positioned about the coil winding area of each of said separate magnetically conductive stacked laminations; and each of the electrically conductive coils being connected [in series with one another] *to aid one another in pushing and pulling flux through the rotor*.

28. The four pole motor as defined in claim 27 wherein each electrically conductive coil comprises an electrically conductive wire that is layer wound in closely packed relationship in a plurality of juxtaposed rows about each said coil winding area.

29. The four pole motor as defined in claim 28 wherein an insulating bobbin with wound electrically conductive coil is positioned about each said coil winding area.

30. The four pole motor as defined in claim 29 wherein the insulating bobbin with wound electrically conductive coil is positioned about each said coil winding area of each said separate magnetically conductive stacked laminations before attachment to the outer free extremities of each pair of stacked side legs.

31. The four pole motor as defined in claim 30 wherein the combined predetermined outer cross sectional winding area of each separate magnetically conductive stacked laminations has a generally circular outer cross sectional shape at least along opposed spaced sections thereof.

32. The four pole motor as defined in claim 27 wherein the electrically conductive wire wound about each insulating bobbin has a predetermined winding length, predetermined mean winding diameter and predetermined wire diameter to achieve desired operating efficiency and cost.

* * * * *